United States Patent
Miyawaki et al.

(10) Patent No.: US 6,980,243 B2
(45) Date of Patent: *Dec. 27, 2005

(54) PHOTOELECTRIC CONVERSION DEVICE PROVIDING ADVANTAGEOUS READOUT OF TWO-DIMENSIONAL ARRAY OF TRANSISTORS

(75) Inventors: Mamoru Miyawaki, Isehara (JP); Mahito Shinohara, Tokyo (JP); Isamu Ueno, Hadano (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 409 days.

(21) Appl. No.: 08/687,945

(22) Filed: Jul. 29, 1996

(65) Prior Publication Data

US 2002/0001037 A1 Jan. 3, 2002

Related U.S. Application Data

(63) Continuation of application No. 08/249,358, filed on May 27, 1994, now abandoned.

(30) Foreign Application Priority Data

May 28, 1993 (JP) .............................................. 5-127087
Aug. 6, 1993 (JP) .............................................. 5-213547

(51) Int. Cl.[7] ........................... H04N 5/335; H04N 3/14
(52) U.S. Cl. ...................................................... 348/302
(58) Field of Search ................................. 348/297, 302, 348/303, 304, 308, 364, 307, 301; 250/208.1

(56) References Cited

U.S. PATENT DOCUMENTS

| | | | | |
|---|---|---|---|---|
| 4,382,187 A | * | 5/1983 | Fraleux et al. ............... | 348/301 |
| 4,573,077 A | * | 2/1986 | Imai ............................ | 348/307 |
| 4,597,012 A | * | 6/1986 | Itoh et al. .................... | 348/308 |
| 4,829,382 A | * | 5/1989 | Hess et al. ................... | 348/364 |
| 4,870,266 A | * | 9/1989 | Ishizaki et al. ........ | 250/214 AG |
| 4,879,470 A | | 11/1989 | Sugawa et al. ............. | 250/578 |
| 5,144,447 A | * | 9/1992 | Akimoto et al. ............ | 348/301 |
| 5,162,912 A | | 11/1992 | Ueno et al. ............ | 358/213.16 |
| 5,184,006 A | | 2/1993 | Ueno ...................... | 250/208.1 |
| 5,210,434 A | * | 5/1993 | Ohmi et al. ............. | 250/208.1 |
| RE34,309 E | | 7/1993 | Tanaka et al. ......... | 358/213.31 |
| 5,262,870 A | | 11/1993 | Nakamura et al. .......... | 358/212 |
| 5,262,871 A | * | 11/1993 | Wilder et al. ............... | 348/307 |
| 5,288,988 A | | 2/1994 | Hashimoto et al. ...... | 250/208.1 |
| 5,436,662 A | * | 7/1995 | Nagasaki et al. ........... | 348/312 |
| 5,615,399 A | * | 3/1997 | Akashi et al. .............. | 348/247 |

FOREIGN PATENT DOCUMENTS

| | | | | |
|---|---|---|---|---|
| EP | 0226338 | | 6/1987 | |
| EP | 0260858 | | 3/1988 | |
| EP | 0444938 | | 9/1991 | |
| EP | 0489724 | | 6/1992 | |
| EP | 0522732 | | 1/1993 | |
| EP | 0552732 | * | 1/1993 | ............ H04N/3/15 |

* cited by examiner

*Primary Examiner*—Aung Moe
(74) *Attorney, Agent, or Firm*—Fitzpatrick, Cella, Harper & Scinto

(57) ABSTRACT

The present invention is intended to provide a photoelectric conversion device provided with a plurality of groups comprising a plurality of adjacent photoelectric conversion elements, wherein the plurality of groups are respectively provided with a detection circuit for detecting a peak signal of each group. The device is advantageously incorporated in an image processing device for outputting corresponding image signals.

14 Claims, 25 Drawing Sheets

PHOTOELECTRIC CONVERSION DEVICE PROVIDING ADVANTAGEOUS READOUT OF TWO-DIMENSIONAL ARRAY OF TRANSISTORS

This application is a continuation of application Ser. No. 08/249,358 filed May 27, 1994, now abandoned.

BACKGROUND OF THE INVENTION

1. Field of the Invention

The present invention relates to a photoelectric conversion device to be used in image sensors employed in copying machines, facsimile machines, video cameras and video recorders, optical sensors represented by AE sensors and AF sensors of cameras and sensors for detecting positions of objects, more specifically, a photoelectric conversion device suited to detect a light such as a micro spot light.

2. Related Background Art

FIGS. 1A to 1C respectively show an example of a conventional photoelectric conversion device (sensor) and FIG. 1A shows a 2-dimensional sensor which has 16 sensor cells, as photoelectric conversion elements, in total, including four sensor cells per line and four sensor cells per row.

In this sensor, each of lines is selected in sequence from the above in the drawing by a vertical shift register VSR and four discrete signals are outputted by the horizontal shift register HSR in time series sequence to the output terminal OUT.

Signals of these sensor cells are outputted in sequence in combinations of line scanning and row scanning.

In an actual sensor, the number of sensor cells amounts to 100 to 100,000 and therefore any method for reducing the read time and the scan time from one cell is obviously limited.

On the other hand, those signals from the sensor cells are visible image signals in most cases. In the case of such visible image, bright signals may be concentrated only at an extremely small area in one frame as the flame of a match in darkness and the remaining area may be occupied by dark signals.

Even in such case, the signals of all cells of the conventional sensor have been outputted in time series sequence and accumulated in an external random access memory, then required image signal processing has been carried out.

On the other hand, in case of the AE sensor (photo sensor for automatic exposure control), the size of the cell is expanded to reduce the number of divided parts and a configuration for ensuring short scanning time is used.

FIG. 1B shows a sensor as described above and each cell ($SS_{11} \ldots SS_{22}$) has a larger light receiving area than the cell shown in FIG. 1A and the number of divisions is 4.

The sensor shown in FIG. 1B, however, cannot discriminate uniform irradiation of weak light onto the whole light receiving surface of the cell (ma 1) from irradiation of strong light only at a part of the light receiving surface of the cell (ma 2) and therefore it is difficult to apply this sensor to detection of a spot light onto a small area.

As described above, the sensor has required a long processing time or has malfunctioned in detection of a light (ma 2) shown in FIG. 1C.

For example, FIG. 2 is a plan view of a pixel of a conventional bipolar sensor. In FIG. 2, 51 is an emitter (serving as the main electrode area where signals based on accumulated carriers are outputted), 52 is an output line formed with AL or the like, 53 is a contact hole for connecting an emitter 51 and an output line 52, 54 is a base (serving as the control electrode area) where an optical charge is accumulated, 55 is a drive line formed with poly-Si or the like for sensor operation of the pixels, 56 is a capacitor $C_{ox}$ formed between the base 54 and the drive line 55, and 57 is a gate of a MOS transistor which is formed with the base of an adjacent pixel as a source and a drain, and comprises part of the drive line 55. 58 is a thick oxidized film for separation between pixels.

FIG. 3 is a sectional view as FIG. 2 is sectioned along line XX' and FIG. 4 is a sectional view as FIG. 2 is sectioned along line YY'. In FIGS. 3 and 4, 59 is a thin oxidized film, 60 is a high density n+ layer provided to separate pixel signals in the YY' direction, 61 is an n epitaxial layer, 62 is a collector (serving as the main electrode area), and 63 is an inter-layer insulation film for separating wires 52 and 55.

In addition, FIG. 5 is an equivalent circuit diagram of an area sensor which is formed with the above-described pixels arranged in 2-dimensional format.

In FIG. 5, S is a pixel of the sensor (equivalently comprising a bipolar transistor 31, a capacitor $C_{ox}4$ and a PMOS transistor 5), 1 is a vertical output line to be connected to the emitter of the pixel S, 6 is a MOS transistor for resetting the vertical output line 1, 7 is a terminal for applying pulses to the gate of MOS transistor, 8 is a horizontal drive line, 9 is a buffer MOS transistor for receiving the output of the vertical shift register and passing a sensor drive pulse, 10 is a terminal for applying the sensor drive pulse, 11 is a wire connected to the drains of PMOS transistors at the right and left ends, 12 is an emitter-follower circuit part for setting a source potential of the PMOS transistor 5 to refresh the pixel S, 13 is a PMOS transistor for setting the base potential of the emitter-follower 12, 14 is a power supply terminal connected to the drain terminal of the PMOS transistor 13, 15 is a terminal for applying pulses to the gate of the PMOS transistor 13, 18 is an accumulation capacitor for accumulating output signal from the pixel S, 19 is a MOS transistor for transferring output signals to the accumulation capacitor 18, 20 is a terminal for applying pulses to the gate of the MOS transistor for transfer, 21 is a horizontal output line, 22 is a MOS transistor for receiving an output of a horizontal shift register and transferring output signals to the horizontal output line 21, 50 is a MOS transistor for resetting the horizontal output line 21, 23 is a terminal for applying pulses to the gate of the MOS transistor 50, and 24 is an amplifier.

A 2-dimensional solid image pickup apparatus shown in FIG. 5 is such that all pixels are reset at once, and can be used in a still video camera and the like.

The operation of this image pickup apparatus is briefly described below.

First a low-level pulse is applied to the terminal 15 to set the PMOS transistor to ON and the output of the emitter-follower circuit part to a positive potential. The output terminal of this emitter-follower circuit part 12 is connected to the source of the PMOS transistor for the pixel S and, if the source potential is sufficiently high enough to turn on the PMOS transistor 5 as compared with the gate potential, holes are injected into the base of the bipolar transistor 31 for pixels (referred to as the "first reset" up to this point). Then the transistor 6 is set to ON and the vertical output line 1 is set to the GND level by applying a high-level pulse to the terminal 7.

Next a forward bias is formed between the base and the emitter of the bipolar transistor 31 by driving the vertical shift register in the above state and applying a reset pulse for the pixels to the terminal 10 to reset in sequence the pixels of each line and set the base of the bipolar transistor 31 for all pixels to a fixed potential and to the reverse bias (referred to as the "second reset" up to this point). After accumulation of photo carriers, a low-level pulse is applied to the terminal 7 to set the MOS transistor 6 to OFF, a read pulse is applied from the terminal 10 to each line selected according to the output of the vertical shift register, a forward bias is formed between the base and the emitter of the bipolar transistor 31, and the signal output of pixels for each line is accumulated in the accumulation capacitor 18 through the MOS transistor 19. The signal output accumulated in the accumulation capacitor 18 is transferred to the horizontal output line 21 through the MOS transistor 22 for transfer selected by the horizontal shift register and outputted through the amplifier 24.

In this case, the accumulation time (Ts) of the sensor is a time from the end of the second reset to application of the read pulse to the terminal 10. In the case of the 1-dimensional linear sensor, the maximum value of the signal from each sensor cell (peak signal) is detected and the accumulation time is controlled according to this maximum value and, in the case of the 2-dimensional area sensor, it is difficult to detect the peak signal because of the property of the circuit and therefore it is also difficult to obtain an appropriate signal level for the whole image. For detecting a position of a pixel which presents the maximum or maximal output on the light receiving surface, there has been a problem that information (or all pixel outputs) should be used and therefore the signal processing time would be longer and a memory would be required.

SUMMARY OF THE INVENTION

An object of the present invention is to provide a photoelectric conversion device capable of solving the above-described technical problems, detecting various types of lights and improving the processing speed.

According to the embodiments of the present invention, the above-described object of the present invention is accomplished by a photoelectric conversion device which is provided with a plurality of groups each of which comprises a plurality of adjacent photoelectric conversion elements and means for detecting a peak signal of each of the above plurality of groups.

In other words, an embodiment of the present invention permits to carry out real-time signal processing by dividing an sensor array comprising a plurality of cells into a plurality of groups (blocks) and detecting the peak signal of each group.

A photoelectric conversion device according to another embodiment of the present invention is provided with a 2-dimensional array of transistors having a control electrode area which comprises first conductive type semiconductors and is able to store carriers generated when photo energy is received, first and second main electrode areas which comprise second conductive type semiconductors different from the first conductive type semiconductors and from which the signals based on accumulated carriers are outputted, and a third main electrode area which comprises the second conductive type semiconductors, and has a plurality of first common output lines to which the first main electrode area is electrically connected in one array direction of the transistors, a plurality of second common output lines to which the second main electrode area is electrically connected in the other array direction of the transistors, a plurality of common drive lines to which the control electrode area is capacitively connected in one array direction or the other array direction of the transistors, and means for applying a potential for biasing at least one of first and second main electrode areas and the control electrode area in the forward direction to the control electrode areas of all transistors connected to the plurality of common drive lines and outputting the peak signals based on the accumulated carriers of a group of transistors to be connected to respective first common output lines from the respective first common output lines or/and outputting the peak signals based on the accumulated carriers of the group of transistors to be connected to respective common output lines from the respective second common output lines.

A photoelectric conversion device according to a further another embodiment of the present invention is provided with a 2-dimensional array of transistors having a control electrode area which comprises first conductive type semiconductors and is able to store carriers generated when photo energy is received, first and second main electrode areas which comprise second conductive type semiconductors different from the first conductive type semiconductors and from which the signals based on accumulated carriers are outputted, and a third main electrode area which comprises the second conductive type semiconductors, and has a plurality of first common output lines to which the first main electrode area is electrically connected in one array direction of the transistors, a plurality of second common output lines to which the second main electrode area of partial or all transistors which are arrayed is electrically connected in common, a plurality of common drive lines to which the control electrode area is capacitively coupled in one array direction or the other array direction of the transistors, means for applying a potential for biasing the second main electrode area and the control electrode area in the forward direction to the control electrode areas of partial or all transistors connected to the plurality of common drive lines and outputting the peak signals based on the carriers accumulated in the partial or all transistors from the respective second common output lines, and means for applying a potential for biasing in sequence the first main electrode area and the control electrode area in the forward direction to respective common drive lines of the plurality of common drive lines and outputting the signals based on the accumulated carriers from the first common output lines.

A photoelectric conversion device according to a further another embodiment of the present invention is provided with a 2-dimensional array of transistors having a control electrode area which comprises first conductive type semiconductors and is able to store carriers generated when photo energy is received, a first main electrode area which comprises second conductive type semiconductors different from the first conductive type semiconductors and from which the signals based on accumulated carriers are outputted, and a second main electrode area which comprises the second conductive type semiconductors, and has a plurality of first common output lines to which the first main electrode area is electrically connected in one array direction of the transistors, a plurality of buffer means the input sides of which are electrically connected to the plurality of common output lines, respectively, and the output sides of which are electrically connected in common, a plurality of common drive lines to which the control electrode area is capacitively connected in one array direction or the other array direction of the transistors, means for applying a potential for biasing the first main electrode area and the control electrode area in the forward direction to the control electrode area of all transistors connected to the plurality of common drive lines and outputting the peak signals based on the carriers accumulated in a group of transistors to be connected to the respective common output lines, and means for applying a potential for biasing in sequence the first main electrode area and the control electrode area in the forward direction to respective common drive lines of the plurality of common drive lines and outputting the peak signals based on the accumulated carriers of the groups of transistors in the other array direction from the output sides of the plurality of buffer means.

A photoelectric conversion device according to a further another embodiment of the present invention is provided with a 2-dimensional array of transistors having a control electrode area which comprises first conductive type semiconductors and is able to store carriers generated when photo energy is received, a first main electrode area which comprises second conductive type semiconductors different from the first conductive type semiconductors and from which the signals based on accumulated carriers are outputted, and a second main electrode area which comprises the second conductive type semiconductors, and has a plurality of common output lines to which the first main electrode area is electrically connected in one array direction of the transistors, a plurality of first buffer means the input sides of which are electrically connected to the plurality of common output lines, respectively, and the output sides of which are electrically connected in common, a plurality of second buffer means the input sides of which are electrically connected to the plurality of common output lines, respectively, and the output sides of which are electrically connected to the accumulation means, respectively, a plurality of common drive lines to which the control electrode area is capacitively connected in one array direction or the other array direction of the transistors, means for applying a potential for biasing the first main electrode area and the control electrode area in the forward direction to respective common drive lines of the plurality of common drive lines in sequence and outputting in sequence the peak signals based on the carriers accumulated in a group of transistors in the other array direction from the output side of the plurality of first buffer means, and means for outputting peak signals based on the accumulated carriers of the groups of transistors in one array direction from the accumulation means after a period while a bias potential is applied in sequence to respective common drive lines of the plurality of common drive lines.

A photoelectric conversion device according to an embodiment of the present invention is provided with two main electrode areas (first and second main electrode areas) of transistors, which are 2-dimensionally arrayed, from which those signals based on carriers accumulated in a control electrode area are outputted, a plurality of first common output lines to which the first main electrode area is electrically connected in one array direction of transistors, and a plurality of second common output lines to which the second main electrode area is electrically connected in the other array direction of transistors, and adapted to output peak signals (for example, a peak signal per row) based on carriers accumulated in a group of transistors in one array direction from the first common output lines and peak signals (for example, a peak signal per line) based on carriers accumulated in the group of transistors in the other array direction from the second common output lines by applying a potential for biasing at least one of first and second main electrode areas and the control electrode area in the forward direction (either of the peak signal per row and the peak signal per line is satisfactory), and detect a position of a pixel which provides the maximum or maximal output (a row or line of pixels in the case of either of the peak signal per row and the peak signal per line) on the 2-dimensional sensor plane in a short period of time by detecting the peak signal per row and the peak signal per line.

For obtaining sensor signals from the transistors, the main electrode area for reading the peak signal and the main electrode area for reading the sensor signals can be jointly used. Specifically, the sensor signals can be read out (the signals of the row and the line can be read out simultaneously) by applying a potential for biasing at least one of first and second main electrode areas and the control electrode area in the forward direction to the control electrode area for each of rows or lines in sequence and a main electrode area (the fourth main electrode area) for reading out the sensor signals can be provided in addition to the main electrode area for reading out the peak signals.

A photoelectric conversion device according to another embodiment of the present invention is provided with two main electrode areas (first and second main electrode areas) of transistors, which are 2-dimensionally arrayed, from which those signals based on carriers accumulated in the control electrode area are outputted, a plurality of first common output lines to which the first main electrode area is electrically connected in one array direction of transistors, and a plurality of second common output lines to which the second main electrode area of partial or all transistors is electrically connected in the other array direction of transistors, and adapted to output the peak signals (peak signals of pixels in the partial or overall area of the light receiving surface of the sensor) based on the carriers accumulated in partial or all transistors from the second common output lines by applying a potential for biasing the second main electrode area and the control electrode area in the forward direction to the control electrode area of partial or all transistors. The present invention allows to detect the peak signals of all sensors and finish the accumulating operation under an appropriate dose of exposure during a period of accumulating operation.

A photoelectric conversion device according to a further another embodiment of the present invention is provided with one main electrode area (first main electrode area) of transistors, which are 2-dimensionally arrayed, from which those signals based on carriers accumulated in the control electrode area are outputted, a plurality of common output lines to which the first main electrode area is electrically connected in one array direction of transistors, and buffer means the input sides of which are electrically connected to the plurality of common output lines, respectively and the output sides of which are electrically connected in common, and adapted to output peak signals (for example, a peak signal per row) based on carriers accumulated in a group of transistors in one array direction from the common output lines to the control electrode area of all arrayed transistors by applying a potential for biasing the first main electrode area and the control electrode area in the forward direction, and peak signals (for example, a peak signal per line) based on carriers accumulated in a group of transistors in the other array direction from the output side of the buffer means to the control electrode area of a group of transistors in the other array direction in sequence by applying a potential for biasing the first main electrode area and the control electrode area of the transistors in the forward direction, and further detect a position of a pixel which provides the maximum or maximal output (a row or line of pixels in the case of one of the peak signal per row and the peak signal per line) on the 2-dimensional sensor plane in a short period of time by detecting the peak signal per row and the peak signal per line.

A photoelectric conversion device according to a further another embodiment of the present invention is provided with one main electrode area (first main electrode area) of transistors, which are 2-dimensionally arrayed, from which those signals based on carriers accumulated in the control electrode area are outputted, a plurality of common output lines to which the first main electrode area is electrically connected in one array direction of transistors, first buffer means the input sides of which are electrically connected to the plurality of common output lines, respectively, and the output sides of which are electrically connected in common, and second buffer means the input sides of which are electrically connected to the plurality of common output lines, respectively, and the output sides of which are electrically connected to accumulation means, and adapted to output peak signals (for example, a peak signal per line) based on carriers accumulated in a group of transistors in the other array direction from the output side of the first buffer means and peak signals (for example, a peak signal per row) based on carriers of the group of transistors in the one array direction accumulated in the accumulation means during the period of applying the bias potential in sequence from the accumulation means to detect the peak signal per row and the peak signal per line, and detect a position of a pixel which provides the maximum or maximal output (a row or line of pixels for detecting one of the peak signal per row and the peak signal per line) on the 2-dimensional sensor plane within a short period of time. The present invention disuses means for applying a bias potential to the control electrode area of all transistors.

Other objects and features of the present invention will be known from the following description and the accompanying drawings.

DETAILED DESCRIPTION OF THE PREFERRED EMBODIMENT

Figure 1A:
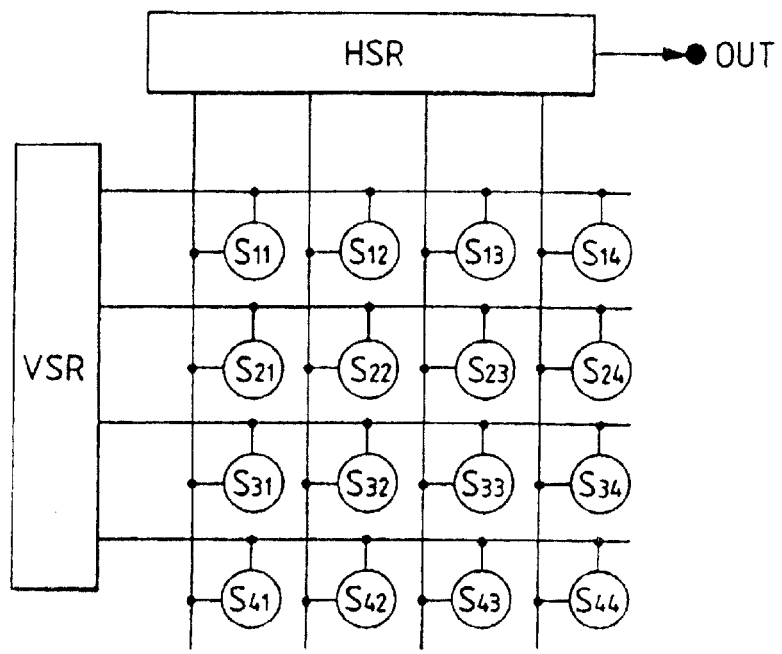
FIGS. 1A–1C are respectively a typical diagram for illustrating a photoelectric conversion device according to the related art.
Figure 1B:
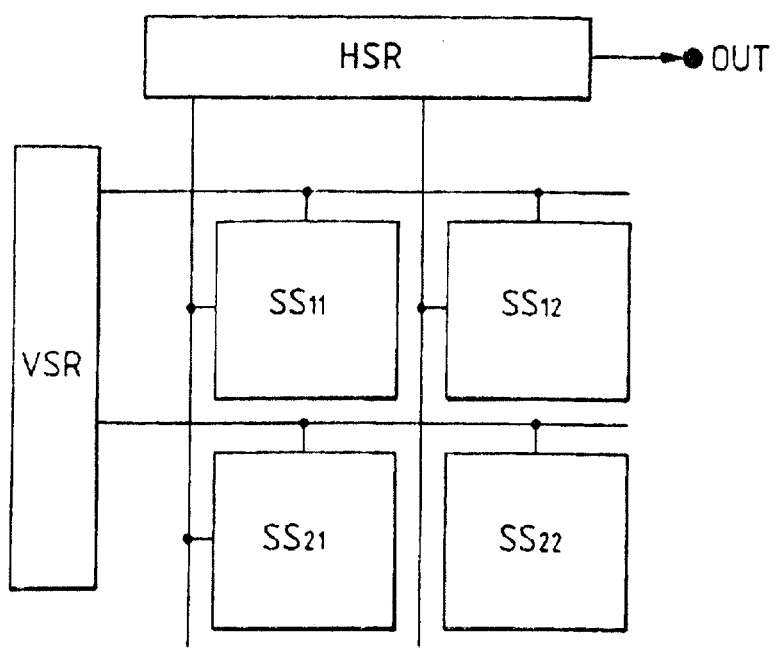
Figure 1C:
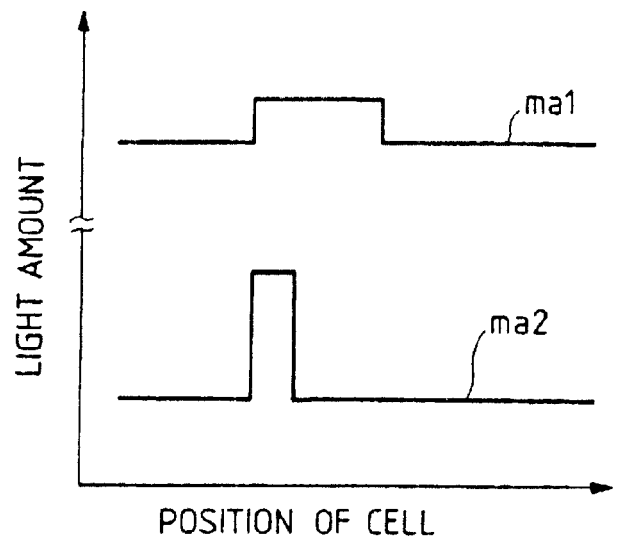
Figure 2:
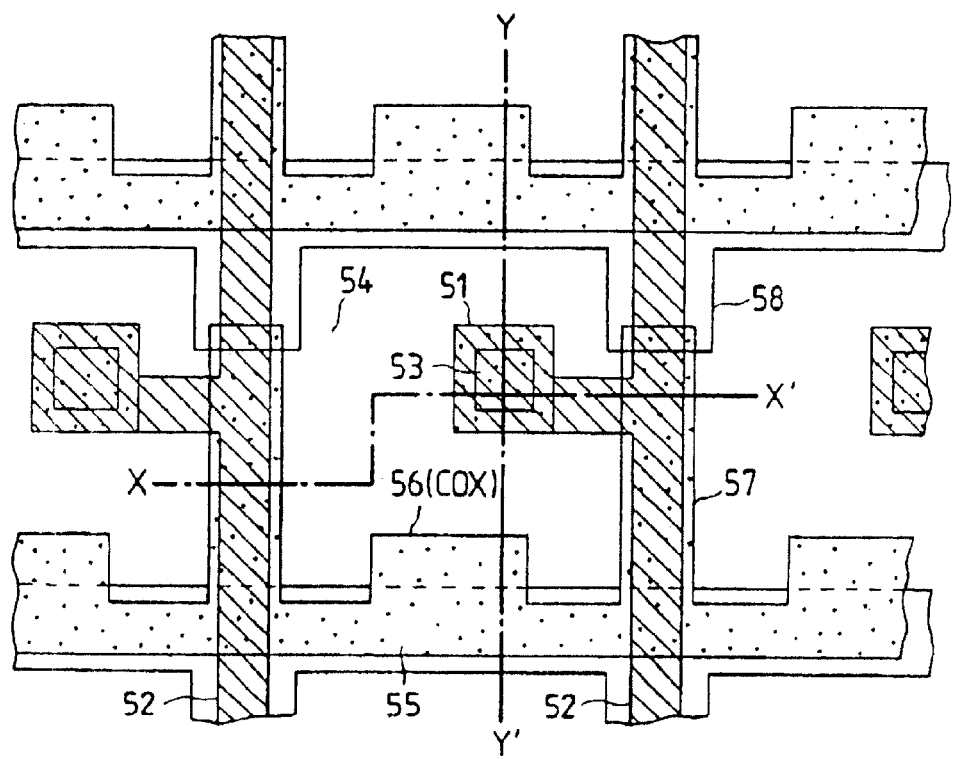
FIG. 2 is a plan view of pixels of a bipolar transistor according to the related art.
Figure 3:
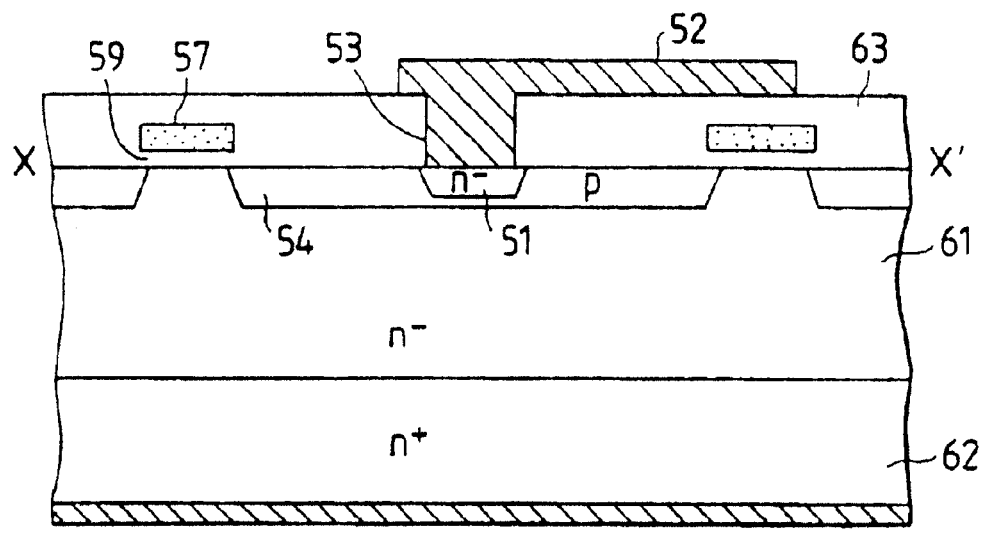
FIG. 3 is a sectional view along line XX' in FIG. 2.
Figure 4:
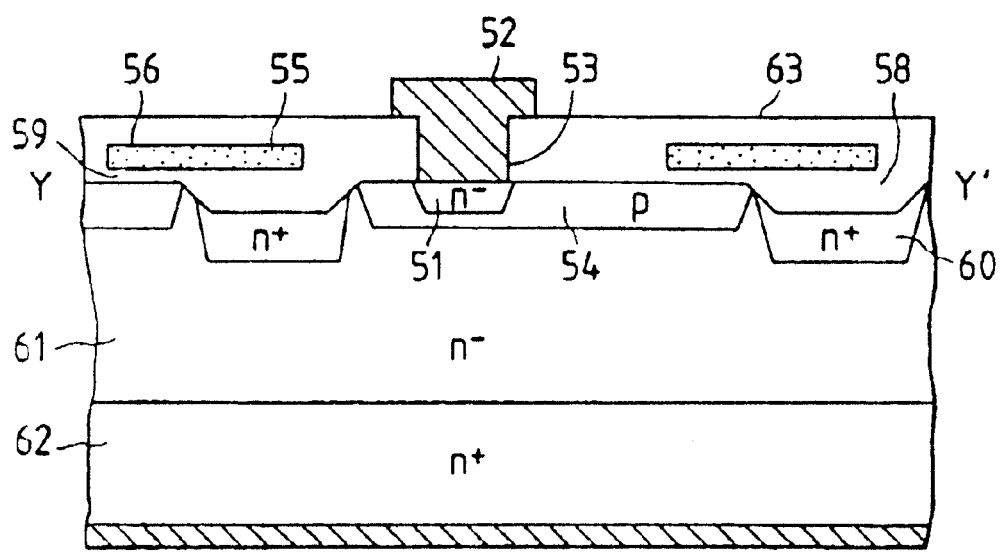
FIG. 4 is a sectional view along line YY' in FIG. 2.
Figure 5:
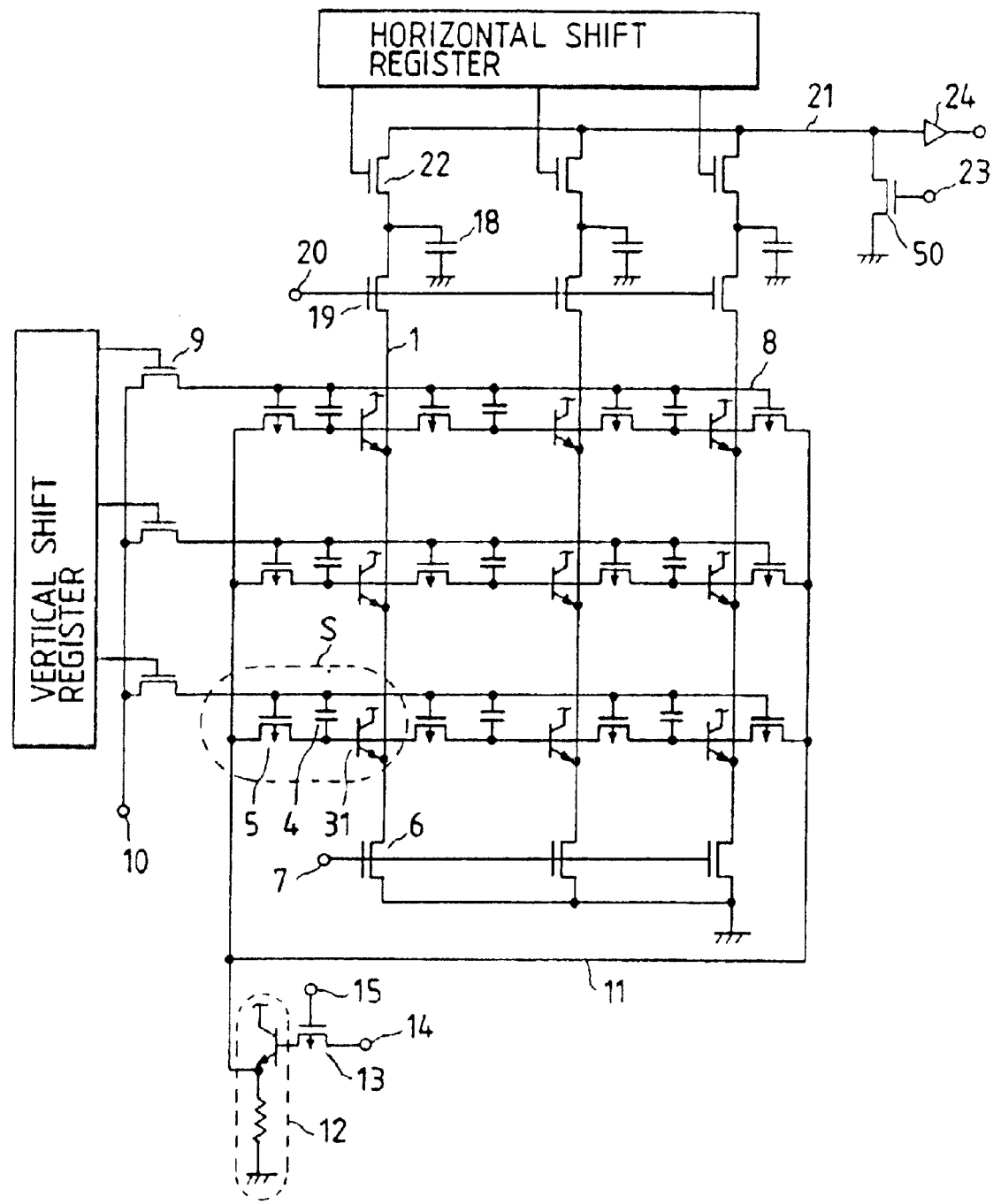
FIG. 5 is an equivalent circuit diagram of an area sensor comprising a 2-dimensional array of pixels shown in FIG. 2.
Figure 6:
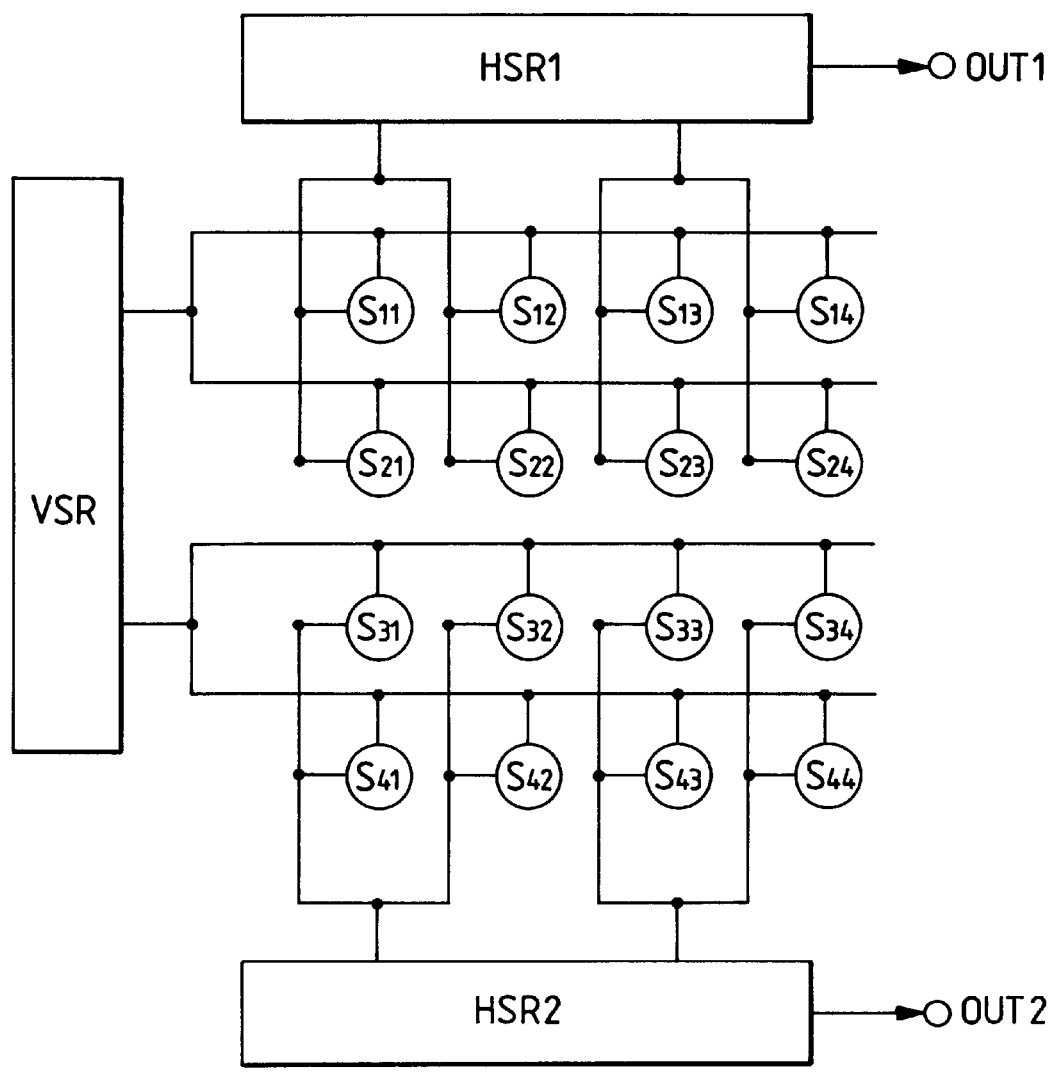
FIG. 6 is a schematic circuit diagram of a photoelectric conversion device according to a mode of the present invention.

FIG. 6 is a schematic circuit diagram showing an embodiment according to the present invention and Sij (i=1, 2, 3, 4; j=1, 2, 3, 4).

Sensor cells are divided into four blocks each having four adjacent cells and the signal output line is commonly connected to the horizontal shift registers (HSR1 and HSR2) for these blocks.

A block is selected by the vertical shift register VSR and the horizontal shift register and a peak signal is outputted to the terminal out1 or out2. Horizontal shift registers can be, of course, assembled into a single unit with one output terminal and the peak signals from four blocks can be outputted in parallel from four output terminals.

Sensor cells to be used for the present invention are required if a signal of a cell which receives the largest amount of light is generated on the output line when the output line is commonly connected, and a photo transistor which stores a photo carrier in the control electrode area such as the base or the gate is preferably used.

Sensor cells are available in a line sensor mode in which the cells are arranged in a 1-dimensional array or an area sensor mode in which the cells are arranged in a 2-dimensional array. The size of the light receiving surface of each cell and the number of cells in each block are appropriately selected and designed in accordance with an application of the sensor. In addition, sensor cells are housed in a single chip as a semiconductor integrated circuit. Signals outputted from this sensor chip are processed as image signals in diversified ways by external circuits.

Figure 7:
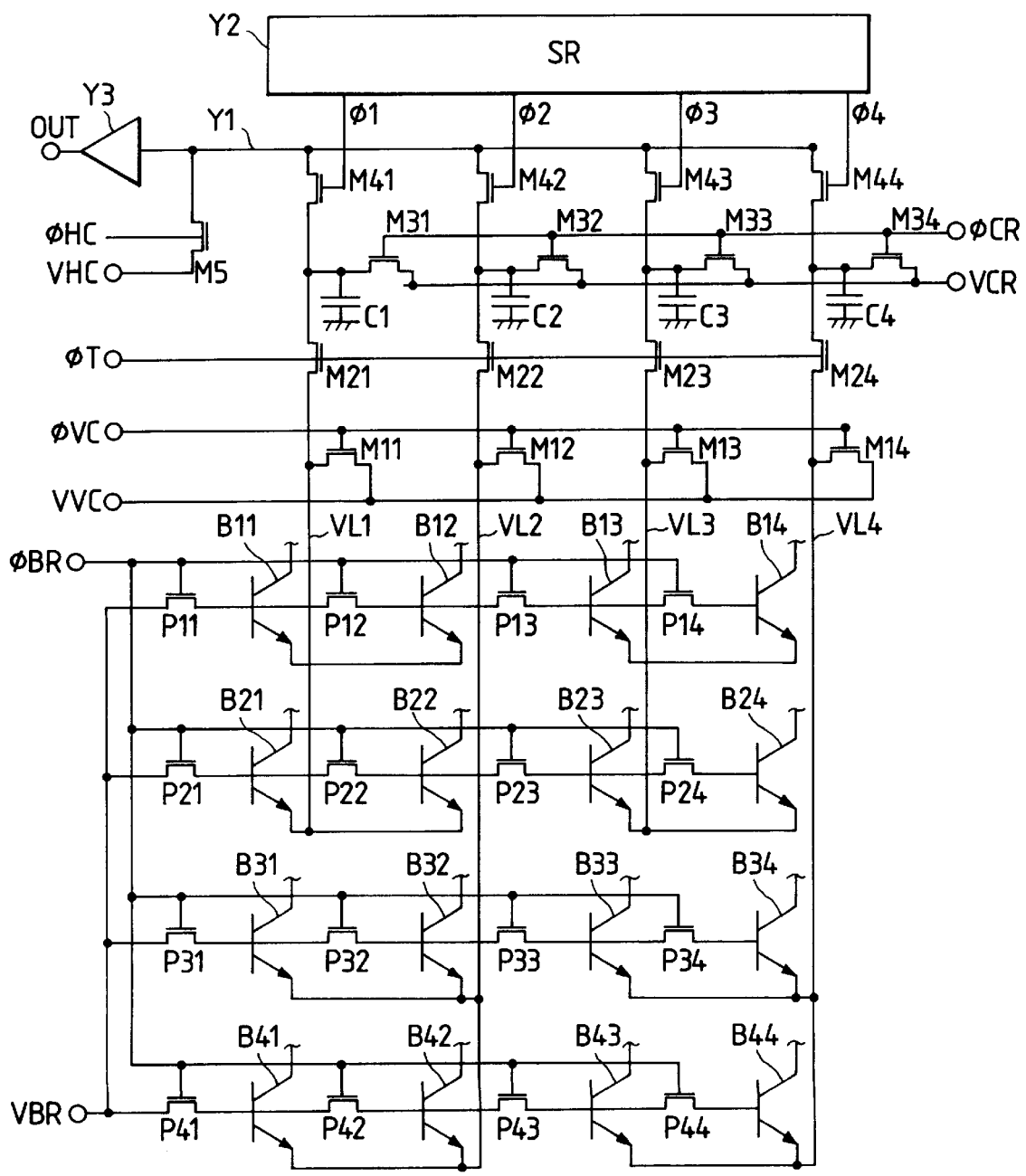
FIG. 7 is a schematic circuit diagram of a photoelectric conversion device according to an embodiment of the present invention.

The first embodiment of the present invention is described, referring to FIG. 7. Bij (i, j=1, 4) is a bipolar transistor as a photo sensor cell, Pij (i, j=1, 4) is a P type MOS switch provided between the base areas of the above-described bipolar transistor, Mij (i, j=1, 4) is a MOS switch; $M_1j$ (j=1–4) is a MOS switch for resetting the sensor output line, $M_2j$ (j=1–4) is a switch for transferring signals from the output line to the capacitor, $M_3j$ (j=1–4) is a switch for resetting the potential of the signal readout capacitor Cj (j=1–4), $M_4j$ (j=1–4) is a switch for selectively supplying output signals to the output line Y1 according to clock signals $\phi_1, \phi_2, \phi_3$ and $\phi_4$ from the shift register, and $M_5$ is a switch for resetting the output line 1. Y2 is a shift register and Y3 is an output amplifier.

Figure 8:
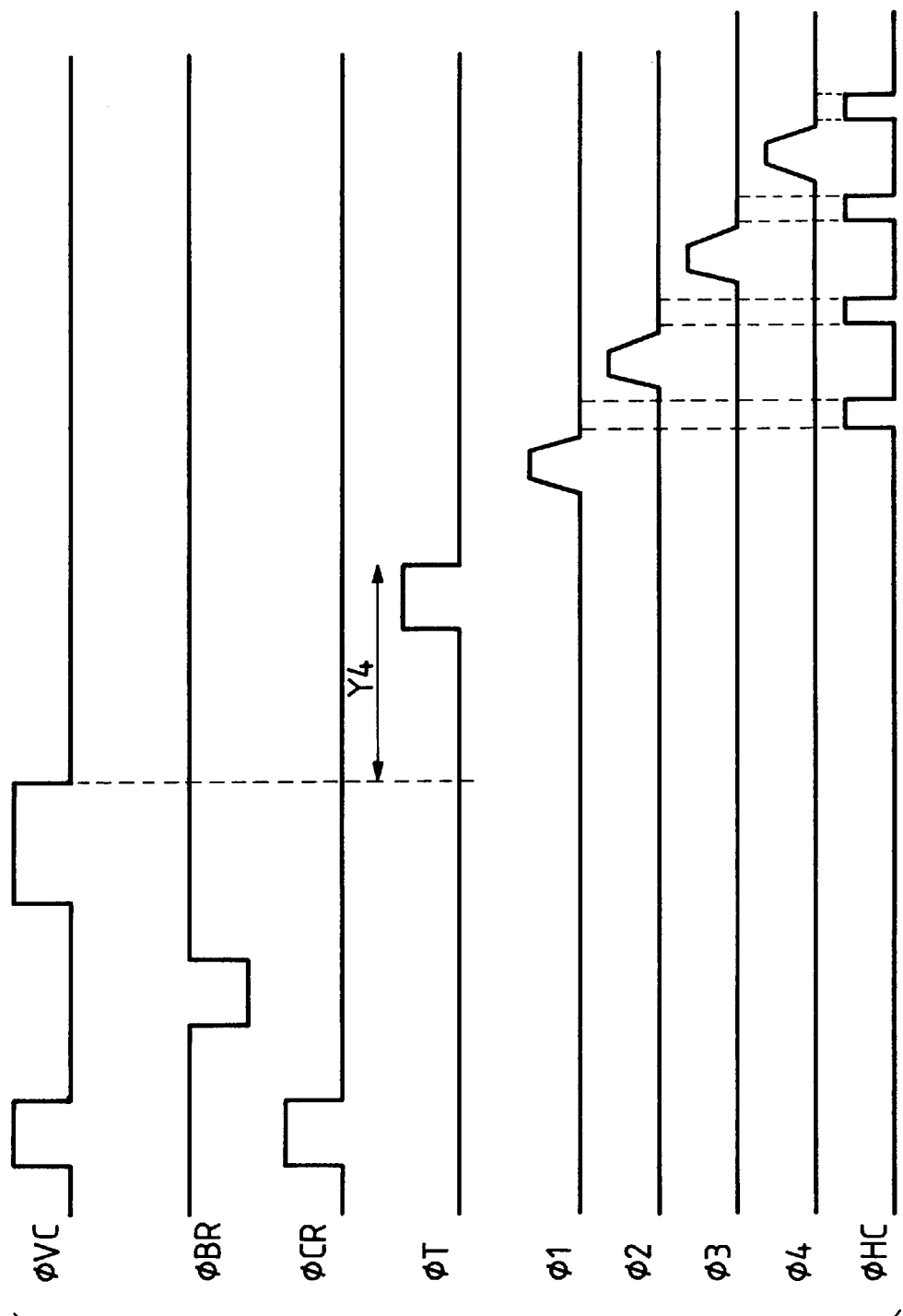
FIG. 8 is a timing chart for illustrating the operation of the photoelectric conversion device according to the first embodiment.

A method for operating this sensor is described below, referring to the timing chart shown in FIG. 8.

The vertical output line VLi (i=1–4) is reset to $V_{VC}$ voltage and the readout capacitor Cj (j=1–4) is reset to $J_{CR}$ voltage by applying a high level pulse $\phi_{VC}$ to the N type MOS switch $M_1j$ (j=1–4) and a high level pulse $\phi_{CR}$ to the N type MOS switch $M_3j$ (j=1–4).

Next the pulse $\phi_{BR}$ of the P type MOS gate is set to a low level to set the P type MOS to ON and the base potential of the bipolar transistor of Pij (ij=1–4) is set to $V_{BR}$. In this case, a voltage of $V_{BR}$ should be set to be approximately at least 1V higher than $V_{VC}$. When the pulse $\phi_{BR}$ is set again to a high level after the pulse $\phi_{BR}$ to the P type MOS gate has been set to a high level and the P type MOS has been set to OFF, and the vertical line level is set to $V_{VC}$, the bipolar transistor is set to the forward bias and the base potential is converged to the constant potential determined by the emitter potential $V_{VC}$. As shown in FIG. 7, the emitters of $P_{11}$, $P_{12}, P_{21}$ and $P_{22}$ are commonly connected to the vertical line $VL_1$ and therefore the bases of the above four bipolar transistors are reset by the potential of the vertical line $VL_1$. A similar procedure is executed with respect to bipolar transistors of $B_{13}, B_{14}, B_{23}$ and $B_{24}$ blocks, bipolar transistors of $B_{31}, B_{32}, B_{41}$ and $B_{42}$ blocks, and bipolar transistors of $B_{33}, B_{34}, B_{43}$ and $B_{44}$.

When the pulse $\phi_{VC}$ is set to a low level, the vertical lines $VL_1$–$VL_4$ come in a floating state and the accumulation period (Y4 in FIG. 8) of an optical signal of each cell starts.

The pulse $\phi_T$ is set to a high level to transfer signals to the signal readout capacitor Cj (j=1–4). In this case, the potential $V_{CR}$ for resetting the readout capacitor should be set to be lower than the vertical line reset potential $V_{VC}$. If the voltage and related factors are set in advance as described above, the potential of the vertical line becomes lower than that in the preceding period when the N type MOS switch $M_2j$ (j=1–4) is set to ON by the $\phi_T$ pulse, and the bipolar transistor Bij (ij=1–4) is set to the forward bias. In this case, the base-emitter bias of the bipolar transistor of a cell which has the largest optical signal level among cells is largest in each block and the emitter potential has a value corresponding to the peak optical signal in that block.

When the $\phi_T$ pulse is set to a low level, a peak signal in $B_{11}, B_{12}, B_{21}$ and $B_{22}$ is read out to the capacitor $C_2$, a peak signal in $B_{13}, B_{14}, B_{23}$ and $B_{24}$ is read out to the capacitor $C_3$, a peak signal in $B_{33}, B_{34}, B_{43}$ and $B_{44}$ is read out to the capacitor $C_4$.

Signals accumulated in the capacitors according to scanning pulses $\phi_1, \phi_2, \phi_3$ and $\phi_4$ through the shift register 2 are outputted from the amplifier Y3 through the output line 1.

Since 2-dimensional information is compressed to a peak signal of a block area and is serially read out, all sensors are extremely useful as means for determining an image at a high speed in a wide area to check, for example, whether a light of an object has been detected on the sensors.

Specifically, when a user observes a camera, a microscope or the like, a light of the LED which is flickering with external pulses irradiates at and reflects from an eye of the user. If this reflected light is detected by the sensor according to the present invention, the reflected light of the LED light is quickly detected in high accuracy and the presence of the user can be determined. Accordingly, it is clearly known that the device can be easily started.

As another application, the sensor according to the present invention is greatly useful in detection of opening and closing of the eyes of an automobile driver. An external LED light is irradiated to the eyes of a driver according to the above method and the reflected light is received by the sensor of the invention. Though a high intensity signal can be detected if the light is reflected from an eye with a normal cornea, the intensity of the reflected light lowers when a driver is sleepy and a time of the closed eyelids becomes long. When the sensor output is lower than the average intensity of the reflected light, a sleepiness preventing apparatus including a buzzer and a seat shaker to give a warning to the driver can be materialized.

The peak signal information of the blocks is useful to detect product labels on factory lines. In addition, it can be also attained by the following structure to distinguish the peak signal of each block from the external light. A capacitor is connected to each peak output portion in series and signal accumulation is performed under the external light to clamp the accumulated signal at its level. Subsequently, accumulation is performed under signal light to detect change of a peak output. A comparator determines whether the detected change exceeds a predetermined level.

Figure 9:
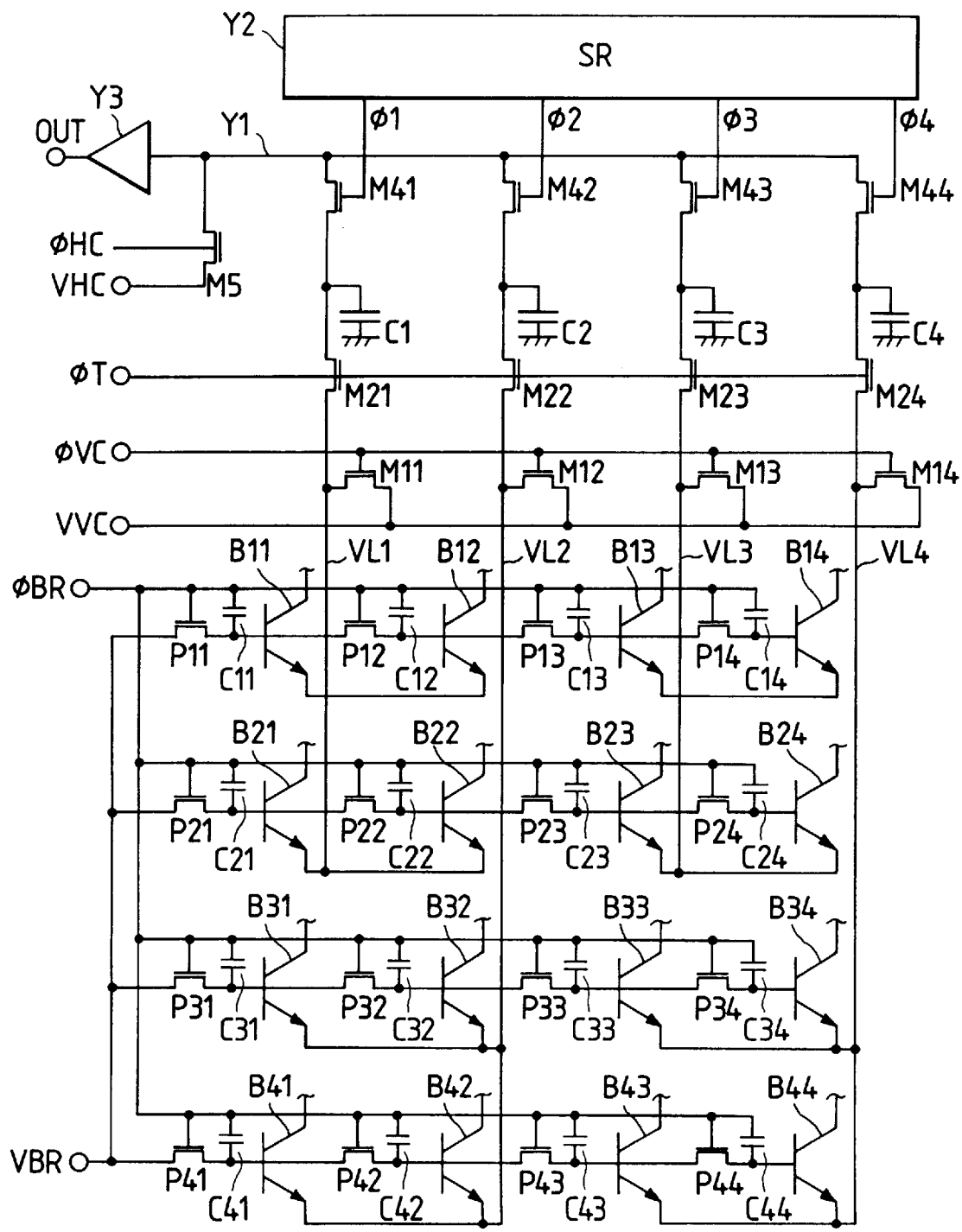
FIG. 9 is a schematic circuit diagram of the photoelectric conversion device according to the second embodiment of the present invention.
Figure 10:
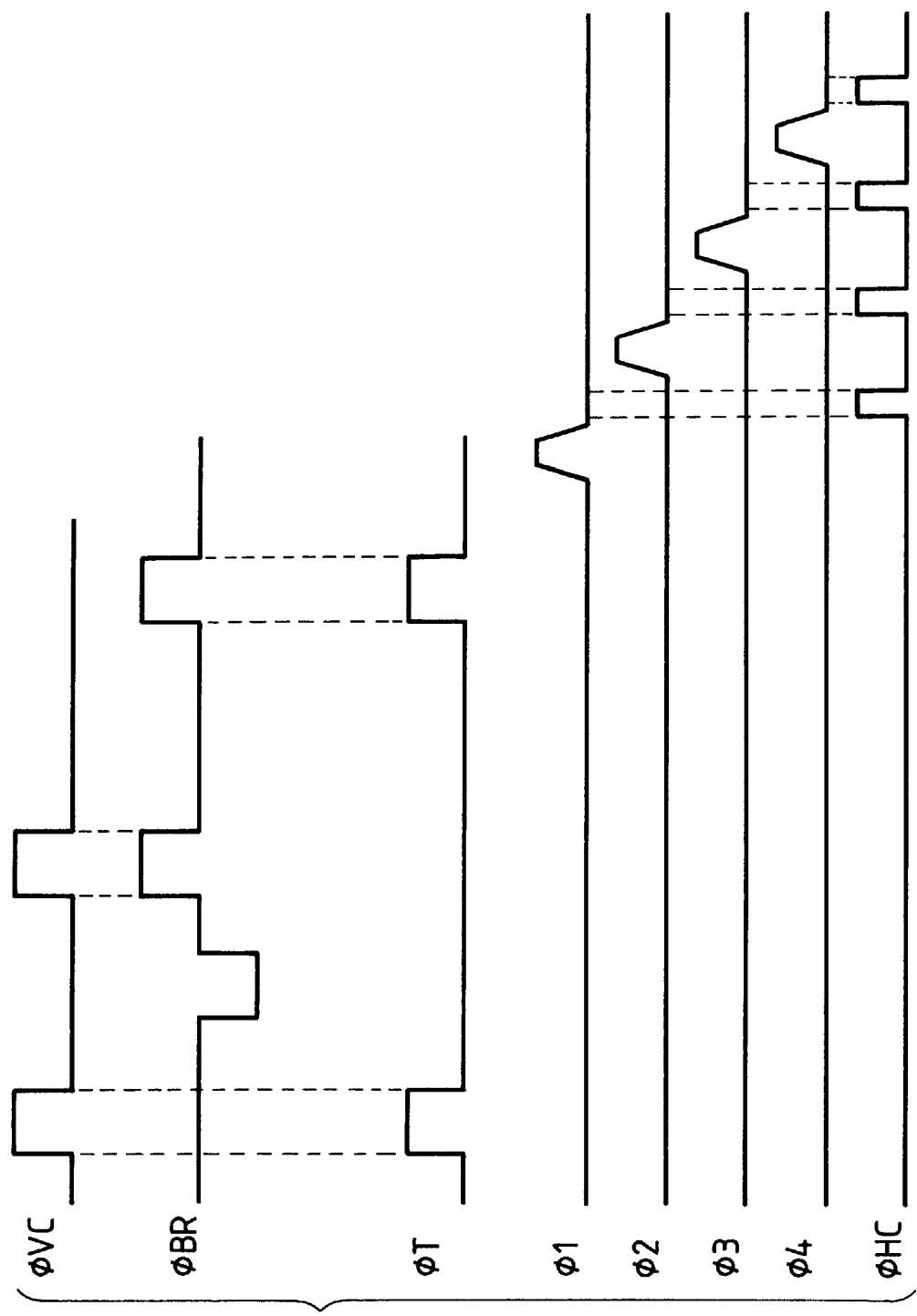
FIG. 10 is a timing chart for illustrating the operation of the photoelectric conversion device according to the second embodiment.

A second embodiment of the invention is described, referring to FIG. 9 showing an equivalent circuit diagram and FIG. 10 showing the timing chart. The same components as those in the embodiment 1 are given the same reference symbols and numerals and the descriptions of these components are omitted.

The second embodiment differs from the first embodiment in that each sensor cell is provided with a base potential control capacitor Cij (ij=1–4) for carrying out a reversely biased accumulating operation. Such construction as described above eliminates a switch for resetting a capacitor for readout operation.

The operation is described below. Pulses $\phi_{VC}$ and $\phi_T$ are set to a high level and the vertical lines VL1–VL4 and the capacitor Ci (i=1–4) to $V_{VC}$.

The $\phi_{BR}$ pulse is changed over from an intermediate level to a low level to set the P type MOS to ON and the base potential is reset to the $V_{BR}$. After resetting, the pulse is reset to the intermediate level. In this state, the $V_{BR}$ level can be selected so that the bipolar transistor is set at OFF.

Then, after the $\phi_{VC}$ pulse is set to the high level to set the vertical lines VL1–VL4 to the $V_{VC}$ level, the $\phi_{BR}$ pulse is changed over from the intermediate level to the high level. Thus the base potential of each bipolar transistor is increased as much as given below through the capacitor Cij (ij=1–4).

$$\frac{C_{ij}}{C_B + C_{ij}}\left(\phi_{BR}^{high\ level} - \phi_{BR}^{middle\ level}\right)$$

In this case, the reset voltages $V_{VC}$ and $V_{BR}$ of the bipolar transistor can be set at a bias value at which the current flows in the forward direction.

As in the first embodiment, the emitters of bipolar transistors of $B_{11}$, $B_{12}$, $B_{21}$ and $B_{22}$ blocks are connected to a common VL1 line and therefore the current flows from this line and is reset to the base potential corresponding to the emitter potential. This is the same with the blocks of other bipolar transistors. After the current has been converged, the $\phi_{BR}$ pulse is reset to the intermediate level and simultaneously the $\phi_{BR}$ pulse of the MOS for resetting is set to a low level to start accumulation of signals. Sensor cells are separated by a P type MOS Pij (ij=1–4). If the $\phi_{BR}$ pulse and the $\phi_T$ pulse are set to a high level after completion of the accumulation, the peak signals of blocks are read out to capacitors $C_1$–$C_4$. Subsequent readout is the same as in the first embodiment.

Figure 11:
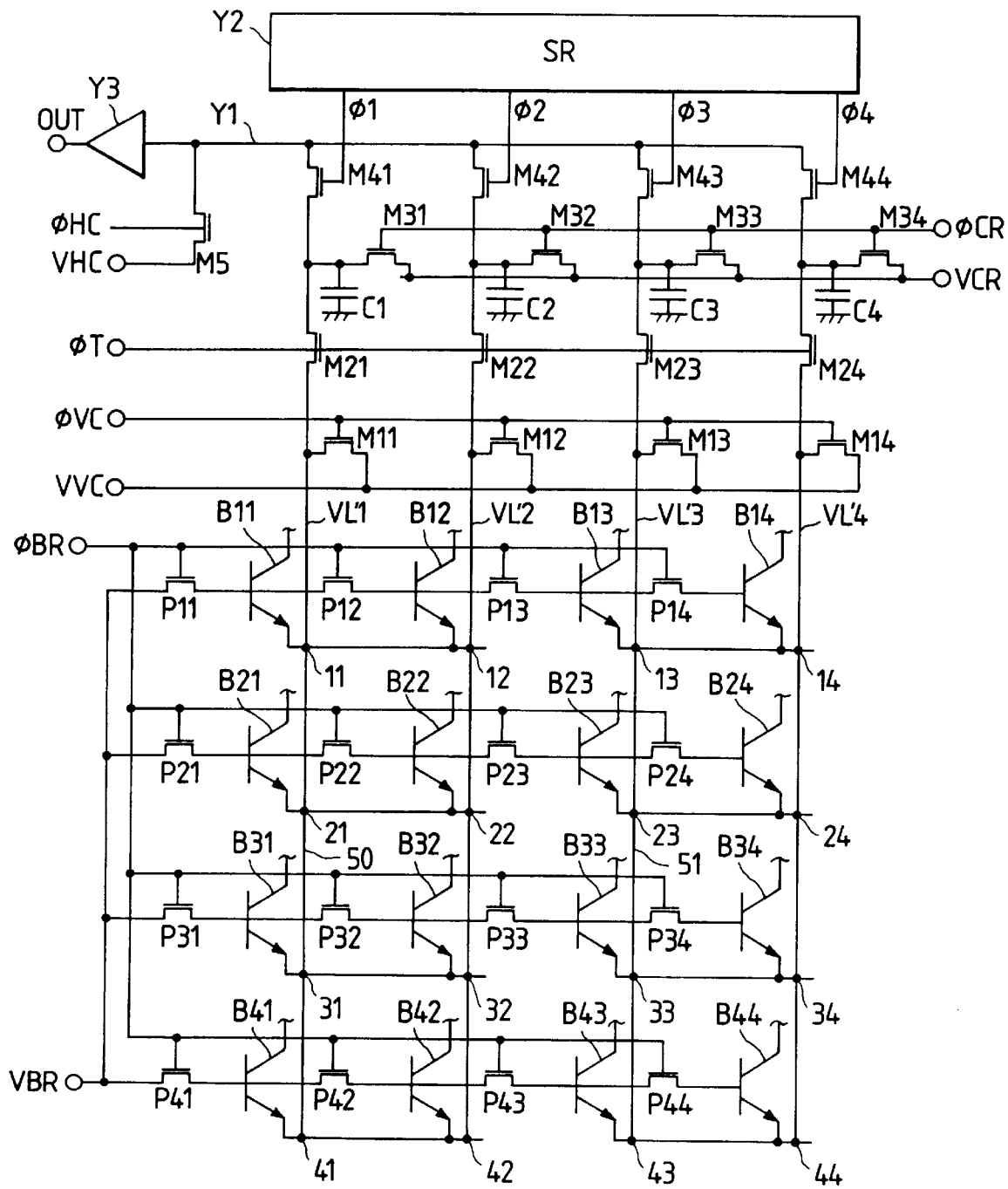
FIG. 11 is a schematic circuit diagram of the photoelectric conversion device according to the third embodiment of the present invention.

The third embodiment is described below, referring to FIG. 11. The same components as those in the embodiment 1 are given the same reference symbols and numerals and the descriptions of these components are omitted. In this embodiment, the wiring has been improved to ensure a symmetry with the vertical lines VL1–VL4 of the first embodiment.

The vertical line VL1 is extended on B31, B32, B41 and B42 blocks of bipolar transistors to be symmetrical to the vertical line VL2 and the vertical line VL3 is extended on B33, B34, B43 and B44 blocks of bipolar transistors to be symmetrical to the vertical line VL4. With this arrangement, the parasitic capacities of the vertical lines are aligned to enable to align the readout gains of all blocks and therefore deviations among the blocks are reduced.

Figure 12:
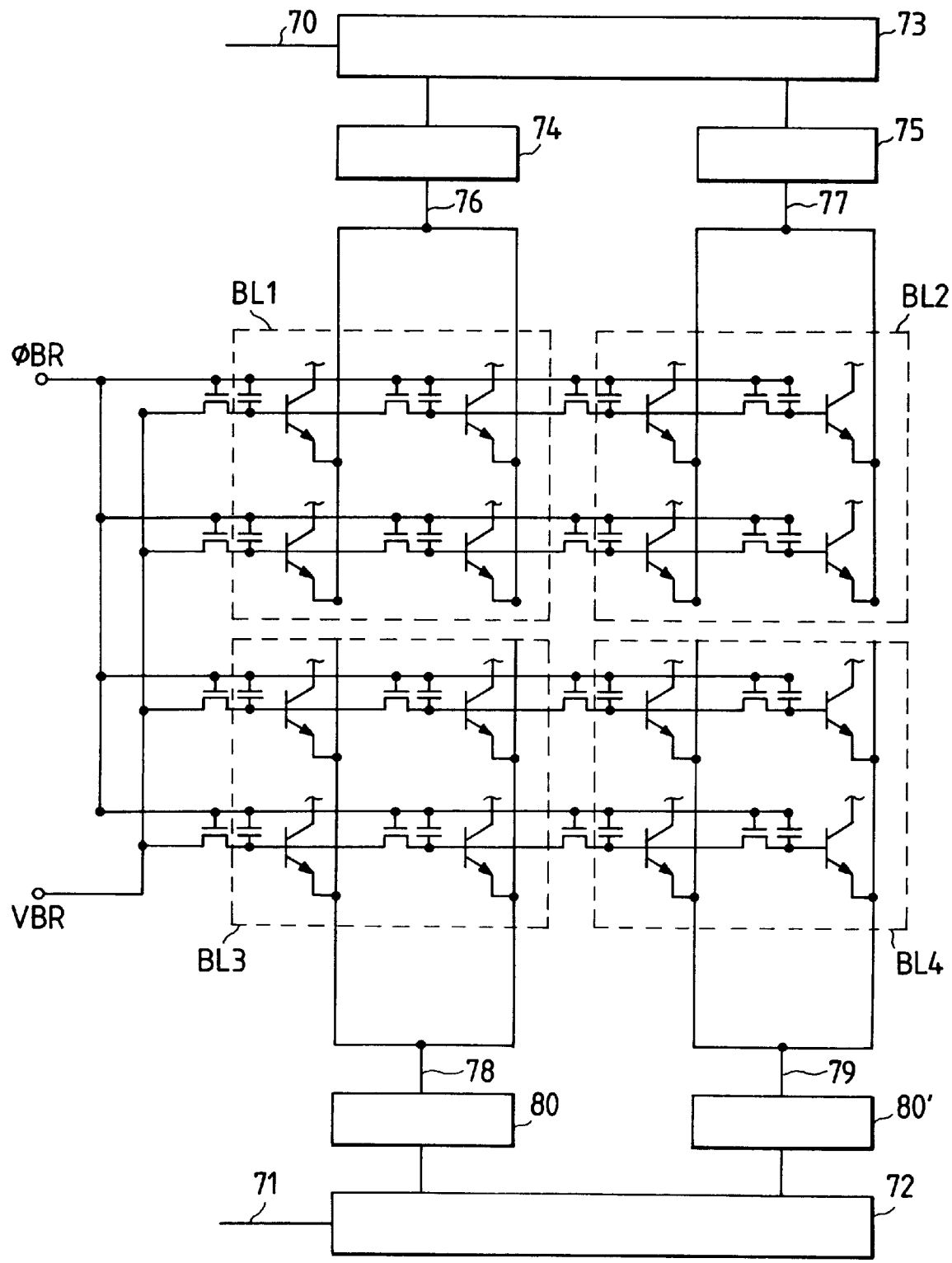
FIG. 12 is a schematic circuit diagram of the photoelectric conversion device according to the fourth embodiment of the present invention.

The fourth embodiment is described, referring to FIG. 12. The fourth embodiment differs from the first to third embodiments in that the outputs of all peak output detection blocks BL1–BL4 are not read out in one direction but are read in parallel in upper and lower directions and therefore the readout speed is improved. 72 and 73 are respectively a shift register, 74, 80 and 80' are readout circuits for reading out the signals of blocks BL1, BL2, BL3 and BL4, 76, 77, 78 and 79 are vertical output lines of the blocks, and 70 and 71 are horizontal output lines.

Figure 13:
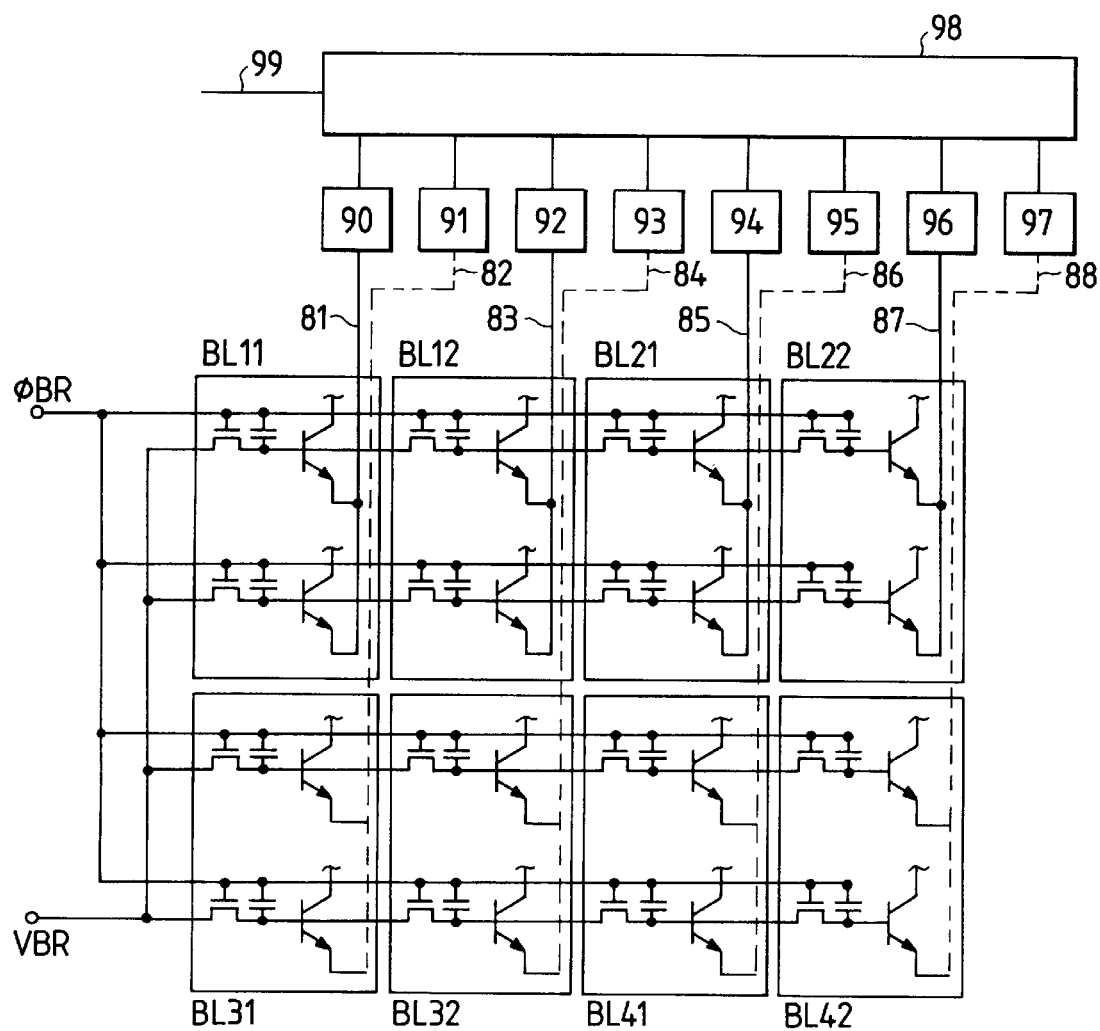
FIG. 13 is a schematic circuit diagram of the photoelectric conversion device according to the fifth embodiment of the present invention.

The fifth embodiment is described, referring to FIG. 13. In this embodiment, the number of blocks is increased by using two types of vertical output lines, for example, a first A1 wire and a second A1 wire. 81 output lines for BL11, 83 output lines for BL12, 85 output lines for BL21 and 87 output lines for BL22 are used respectively and, for example, the A11 wire is used for these output lines, while 82 output lines for BL31, 84 output lines for BL32, 86 output lines for BL41 and 88 output lines for BL42 are used respectively and the A12 wire is used for these output lines. The signals from these output lines are read out in parallel into the readout circuits 90–97, scanned in the shift register 98 and outputted to the shift register 99. It is clearly known that the number of divided blocks can be increased by combining the embodiments as described above.

Figure 14:
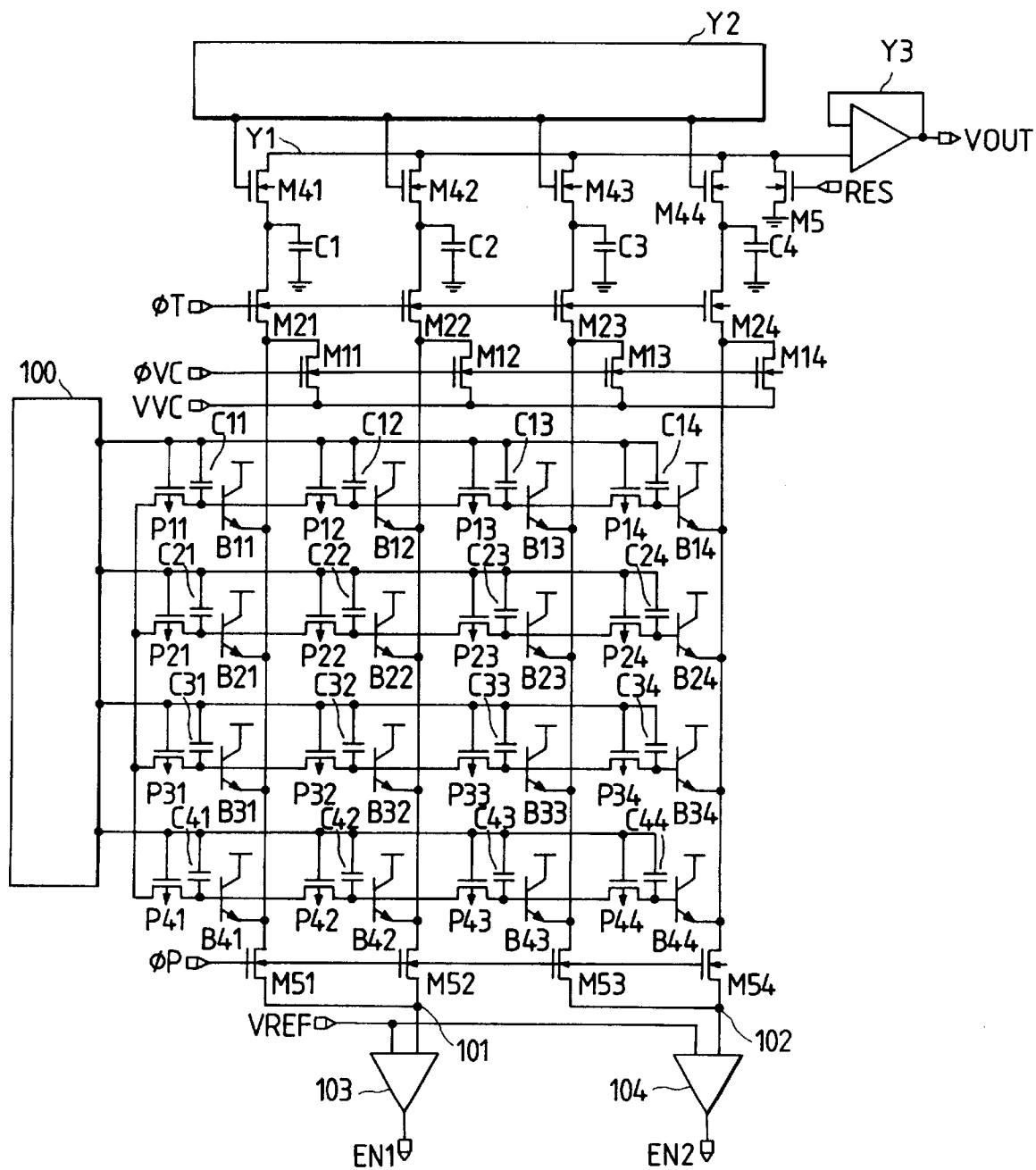
FIG. 14 is a schematic circuit diagram of the photoelectric conversion device according to the sixth embodiment of the present invention.

The sixth embodiment is described, referring to FIG. 14. The sixth embodiment is intended to simultaneously implement reading out of ordinary bits in addition to the peak signal of a desired block area of the sensor. 100 denotes a vertical shift register for driving the drive line for reading the bits. MOS switches $M_{5}j$ (j=1–4) are provided to collect the peak signals of pixels of two rows from the left and the peak signals of pixels of two rows from the right. The former peak signals are collected to 101 and the latter peak signals are collected to 102 according to the $\phi_P$ pulse and entered into comparators 103 and 104 for comparison with the reference level VREF. In this embodiment, the peak signals of respective blocks are not serially converted but are simultaneously outputted and a decision signal for checking whether or not the peak signal has reached a higher peak value than required value and therefore a state of image can be quickly determined from the above peak data.

On the other hand, the data accumulated in each pixels, are outputted by the device operation described with respect to the first embodiment.

Since the peak signals of a desired block of the image and the pixel signals are simultaneously outputted as described above, the pixel signals can be read out only when rough image information is obtained with the peak signals of the blocks.

Figure 15:
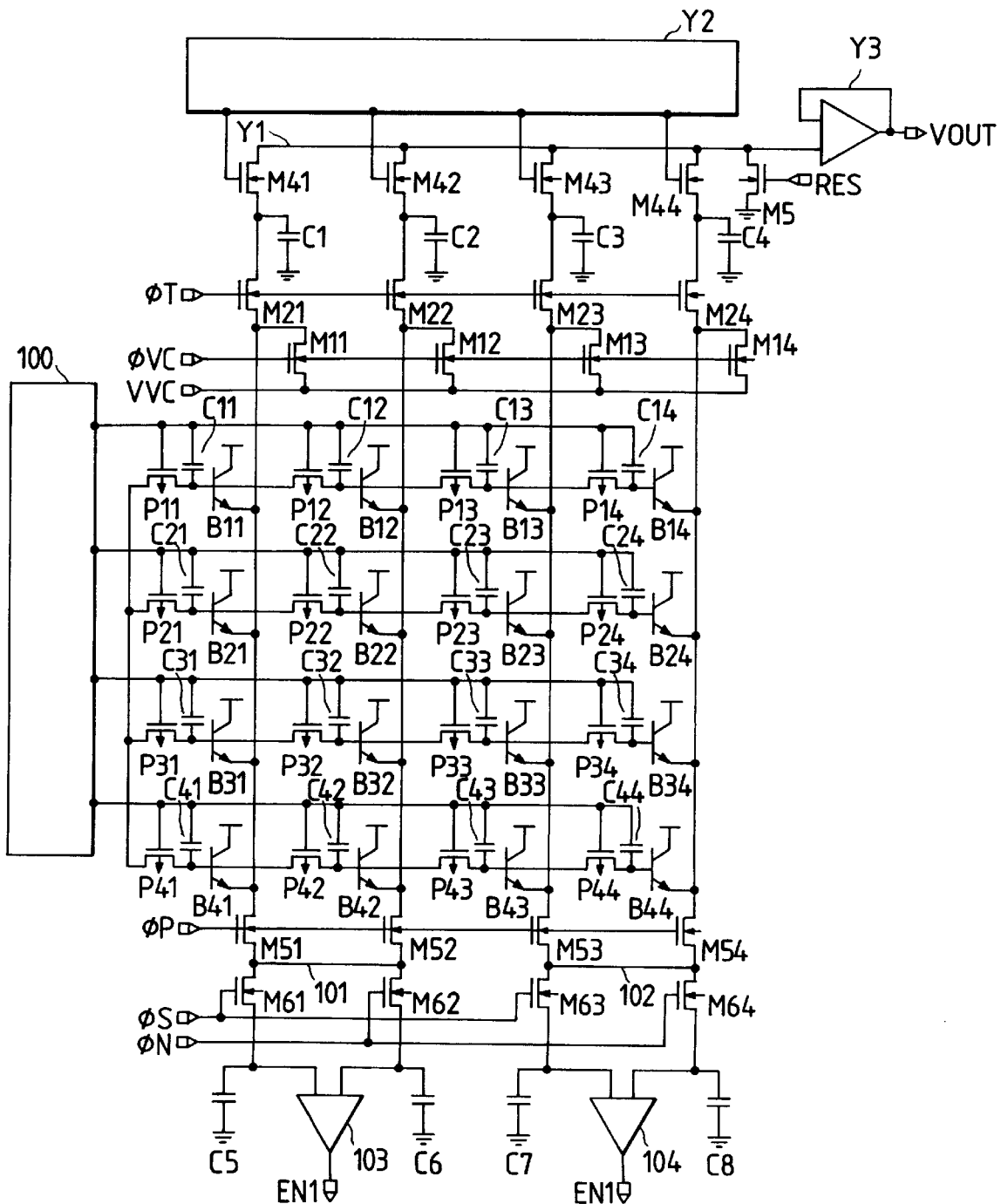
FIG. 15 is a schematic circuit diagram of the photoelectric conversion device according to the seventh embodiment of the present invention.

The seventh embodiment of the invention is described, referring to FIG. 15.

Though the reference level VREF and the peak signal are compared in the sixth embodiment, the seventh embodiment differs from the sixth embodiment in that the reference level in the seventh embodiment is defined as the darkness level. MOS switches $M_6 j$ (j=1–4) are for changing over the output before and after accumulation and their switching operations are controlled with pulses $\phi_S$ and $\phi_N$. The $\phi_N$ pulse is set to a high level before accumulation and its output is accumulated in capacitors $C_6$ and $C_8$, respectively, through the MOS switches $M_{62}$ and $M_{64}$. After storing the optical signals, the $\phi_S$ pulse is set to a high level and its output is accumulated in capacitors $C_5$ and $C_7$, respectively, through the MOS switches $M_{61}$ and $M_{63}$. The peak signals of the block can be detected in reference to the darkness level by entering respective values of the outputs into comparators 103 and 104.

The configuration of this embodiment is advantageous in that not only whether there is an incident light to the sensor can be easily determined but also stable results can be obtained even with environmental changes because the output at the time of darkness and the output when a light is irradiated change in the same way even if a change of temperature or the like occurs.

Figure 16:
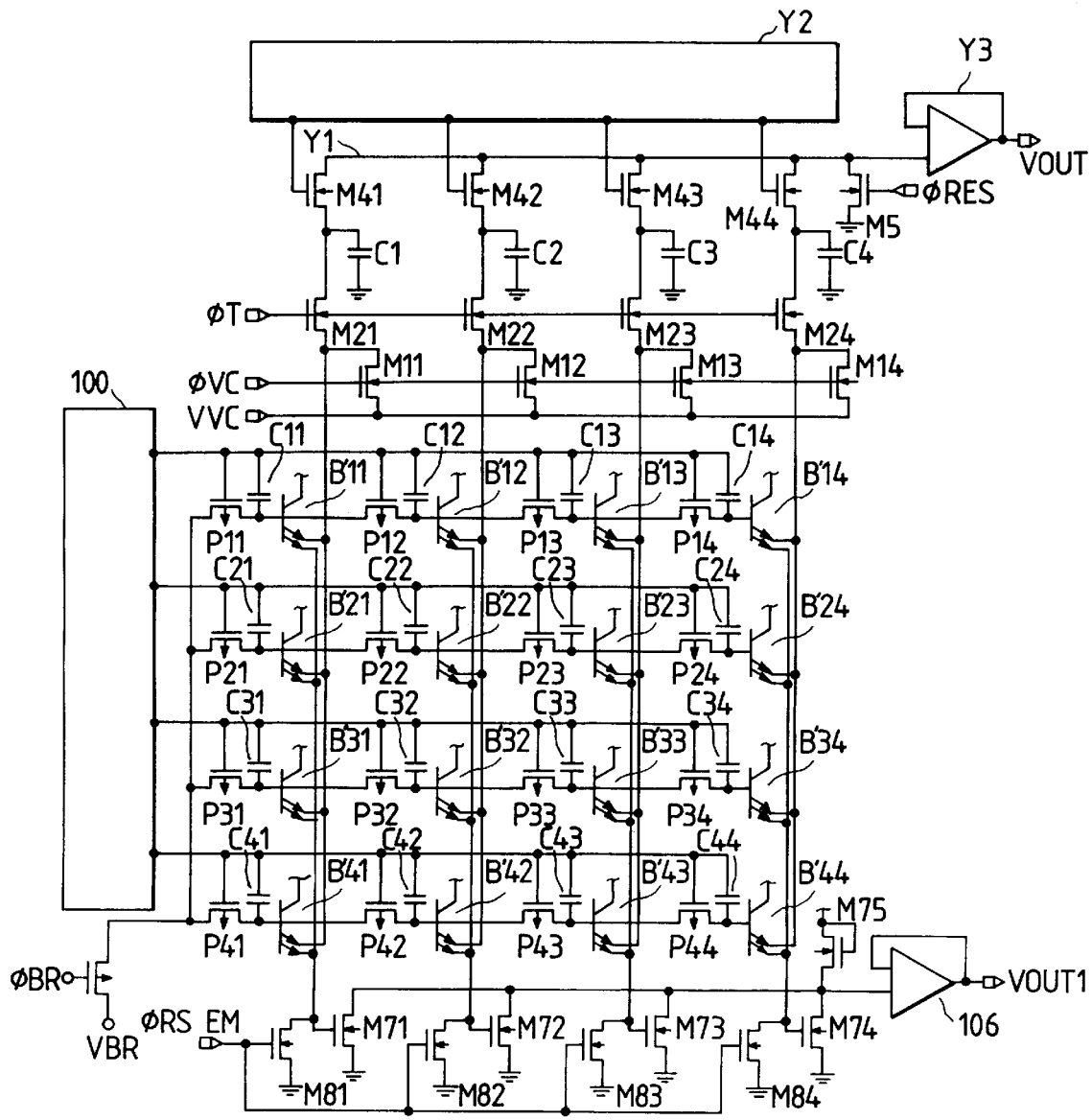
FIG. 16 is a schematic circuit diagram of the photoelectric conversion device according to the eighth embodiment of the present invention.

The eighth embodiment is described, referring to FIG. 16. This embodiment employs a configuration in which the sensor bipolar block B' ij (ij=1–4) is provided with two emitters, one of which is provided exclusively for reading the pixel signals and the other of which is provided for detecting the peak signals, the peak signal output being connected to the gate of the amplifier.

The MOS amplifier comprises MOS switches $M_7 i$ (i=1–4) and a switch $M_{75}$ and the peak outputs of the blocks are entered into the gates of MOS switches $M_7 i$ (i=1–4). Reset switches $M_8 j$ (j=1–4) and a reset pulse $\phi_{RS-EM}$ are provided to reset the vertical lines for detecting the peak signals. With this configuration, the added-up peak output of all rows is outputted from the amplifier 106. Addition in this case is not ordinary linear addition and is addition of square roots of the outputs. However, there is no problem in an application where the linearity is not demanded in the peak outputs.

Though the peak values of all rows are added in this embodiment, it is easily implemented to divide the peak value output into blocks for output.

In this embodiment, a plurality of spot lights are irradiated onto the sensor part and the peak signals are used to count up the number of spot lights. Bit outputs can be used to check the relative positions of the spot lights and the image processing can be executed at a high speed.

The embodiment as described above can provide a photoelectric conversion device capable of detecting even extremely small spot lights and processing signals at a high speed.

The ninth embodiment of the invention is described in detail, referring to the corresponding drawing. In the first to eighth embodiments and the embodiments described in the following, the photoelectric conversion elements are bipolar transistors and, if the present invention specifies a non-destructive sensor, those transistors with other constructions can be used as the sensor.

Figure 17:
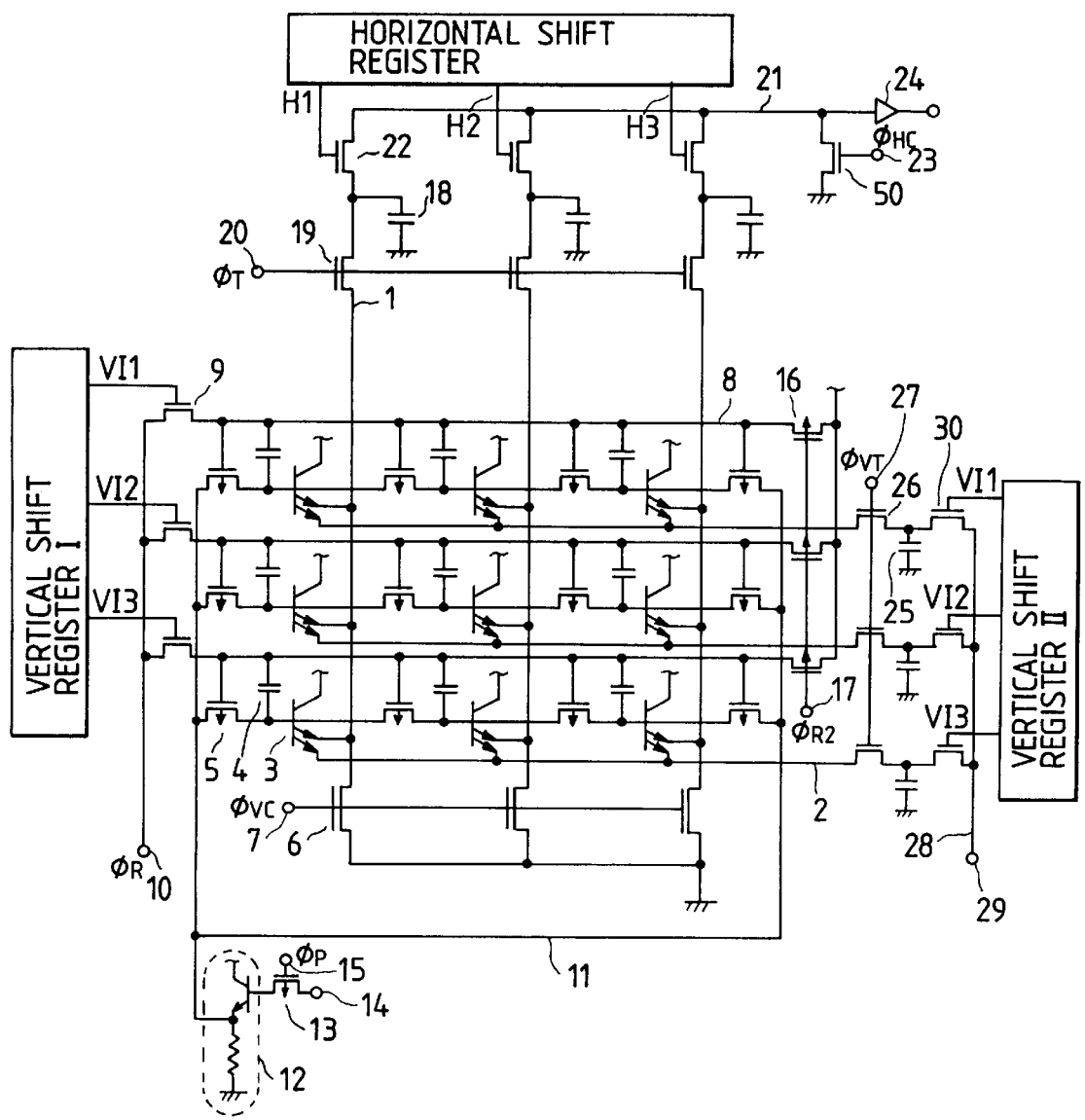
FIG. 17 is a schematic circuit diagram showing the first embodiment of the photoelectric conversion device according to the present invention.

FIG. 17 is a schematic circuit diagram showing the ninth embodiment of the photoelectric conversion device according to the invention. For simplification of the description, a 2-dimensional sensor having a 3×3 pixel array is shown in FIG. 9. The same components shown in FIG. 17 are given the same reference numerals and symbols as in FIG. 9.

In FIG. 17, 1 is a vertical output line, 2 is a horizontal output line and 3 is a bipolar transistor having a double emitter (two main electrode areas from which a signal based on a carrier is outputted) for storing carriers at its base, the first emitter of which is connected to the vertical output line 1 and the second emitter of which is connected to the horizontal output line 2. 4 is a capacitor for controlling the base potential of the bipolar transistor 3, 5 is a PMOS transistor for resetting the base of the bipolar transistor 3, 6 is a MOS transistor for grounding the vertical output line 1, 7 is a terminal for applying pulses to the gate of the MOS transistor, 8 is a horizontal drive line for controlling the base potential of the bipolar transistor 3 through the capacitor 4 and resetting and reading out the pixels, 9 is a buffer MOS transistor which is turned to ON to select a line of pixels to be driven when the output of the vertical shift register is applied to the gate, 10 is a terminal for applying a drive pulse for pixels, 11 is a wiring to be connected to the drains of right end and left end PMOS transistors 5, 12 is an emitter-follower circuit part the output of which is connected the wiring 11, 13 is a MOS transistor for controlling the base potential of the emitter-follower circuit part 12, 14 is a power supply terminal to be connected to the drain terminal of the MOS transistor 13, 15 is a terminal for applying pulses to the gate of the MOS transistor 13, 16 is a PMOS transistor the drain of which is fixed at a positive potential, 17 is a terminal for applying pulses to the gate of the PMOS transistor 16, 18 is a capacitor for storing a pixel output potential to be outputted through the vertical output line 1, 19 is a MOS transistor for switching the vertical output line 1 and the capacitor 18, 20 is a terminal for applying pulses to the gate of the MOS transistor 19, 21 is a horizontal output line, 22 is a MOS transistor which connects the capacitor 18 and the horizontal output line 21 to be selected according to the output of the horizontal shift register, 50 is a MOS transistor for grounding the horizontal output line 21, 23 is a terminal for applying pulses to the gate of the MOS transistor 50, 24 is an amplifier into which the potential of the horizontal output line 21 is entered, 25 is a capacitor for storing a pixel output potential to be outputted through the output line 2, 26 is a MOS transistor for switching the output line 2 and the capacitor 25, 27 is a terminal for applying pulses to the gate of the MOS transistor 26, 28 is an output line to which the potential of the capacitor 25 is outputted, 29 is an output terminal of the output line 28, and 30 is a switching MOS transistor which is selected according to the output of the vertical shift register II and connects in sequence the capacitor 25 and the output line 28.

Figure 18:
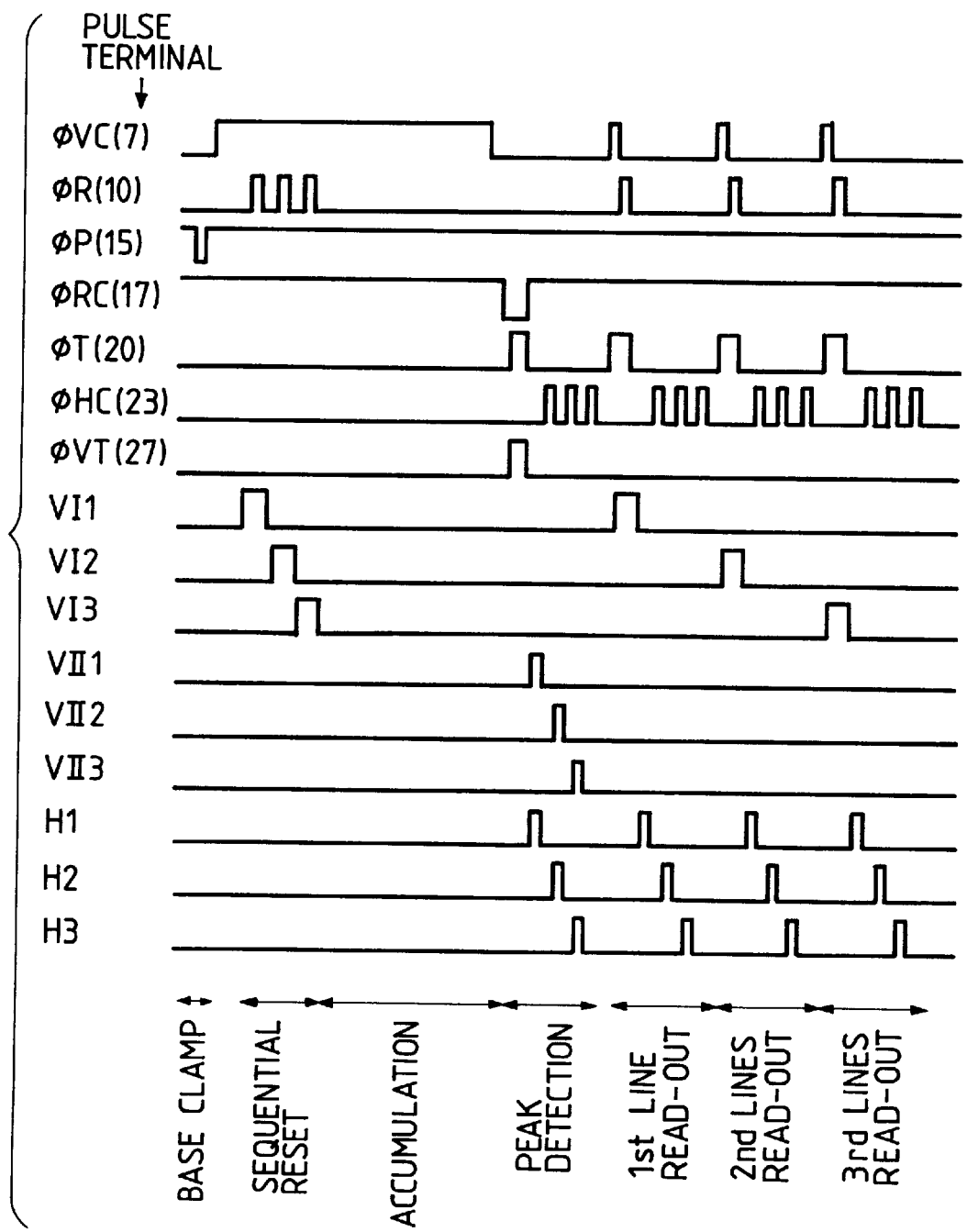
FIG. 18 is a timing chart of pulses for driving the photoelectric conversion device shown in FIG. 1.

The following describes the operation of this sensor, referring to the timing chart shown in FIG. 18. In FIG. 18, $\phi$VC, $\phi$R, $\phi$P, $\phi$RC, $\phi$T, $\phi$HC and $\phi$VT are respectively sensor drive pulse terminals to be connected to pulse input terminals 7, 10, 15, 17, 20, 23 and 27. VI1, VI2 and VI3 are the output terminals of the vertical shift register I for selecting one line, two lines and three lines, respectively, VII1, VII2 and VII3 are the output terminals of the vertical shift register II for selecting one line, two lines and three lines, respectively, and H1, H2 and H3 are the output terminals of the horizontal shift register for selecting the capacitor 18 of first, second and third lines, respectively, and transferring the signals to the horizontal output line 21.

First the $\phi$P terminal is set to a low level to make the output potential of the emitter-follower circuit part 12 a positive potential. At this time, the potential of the horizontal drive line 8 to be connected to the gate of the PMOS transistor 5 has a low level and the PMOS transistor turns on to make the base potential of the bipolar transistor 3 for all pixels equal to the output potential of the emitter-follower circuit part 12 (the first reset up to this step).

When the $\phi$VC terminal is set to a high level and the vertical output line 1 is grounded after the $\phi$P terminal has been set to a low level and the output terminal of the emitter-follower circuit part 12 has been set to GND, an emitter current flows from the first emitter of the bipolar transistor 3 for each pixel and the base potential thereof lowers. In addition, the vertical shift register I is started, buffer MOS transistors 9 are set to ON in sequence for respective lines through the $\phi$R terminal, and the pulses are applied to the horizontal drive line 8. Though the base potential of the pixels of a line for which the horizontal drive line 8 has come to have a high level is raised temporally by capacity coupling of the capacitor 4, the base potential lowers when the emitter current of the first emitter flows again, and the base potential is changed over to a negative value by the above-described capacity coupling and the emitter-base circuit is reversely biased when the potential of the horizontal drive line 8 comes to a low level (the second reset up to this step).

When this reverse bias state is established, the carriers generated from the incident light are accumulated at the bases of respective pixels and the base potential rises in accordance with the amount of accumulated charge (the accumulation process up to this step).

The MOS transistors 6 are set to OFF and the vertical output line 1 are set to floating by setting the $\phi$VC terminal to a low level, and the PMOS transistors 16 are set to ON and the potentials of all horizontal drive lines 8 are set to a high level by setting the $\phi$RC terminal to a low level. In this case, the base potential of each pixel is raised by the capacity coupling of the capacitors 4 and the emitter-base bias is set to a forward bias state. The output value of the maximum output pixel in each row appears on the vertical output lines 1 and the output value of the maximum output pixel in each line appears on the output lines 2 and the potentials of the output lines 1 and 2 are accumulated in the accumulation capacitors 18 and 25 through MOS transistors 19 and 26. Then the horizontal shift register and the vertical shift register II are started and the potentials of capacitors 18 and 25 are outputted in sequence from the output terminal of the amplifier 24, and the output terminal 29. The x coordinate of the peak pixel can be known from the peak of the sequential output potential of the output of amplifier 24, and the y coordinate of the peak pixel can be known from the peak of the sequential output potential from the output terminal 29 (the following describes detection of peak output positions).

Reading out of the outputs of respective pixels is carried out for each line selected by the vertical shift register I. After the vertical output line I is grounded with a pulse from the φVC terminal to have a zero potential, the vertical output line 1 is set to floating and a pulse of the high level φR terminal is applied to the horizontal drive line 8 of the selected line. The output potentials of pixels of the selected line appears on the vertical output lines 1 and the output potentials are accumulated in the capacitors 18 according to the pulse from the φT terminal. The output potentials of the capacitors 18 are transferred in sequence the horizontal output line 21 by the horizontal shift register through the amplifier 24. When the above-described readout operation is finished on all lines, the outputs of all pixels are outputted from the amplifier 24.

As described above, in this embodiment, the peak output of the pixel is read out and the peak position can be detected. A peak signal is sent to the capacitors 18, which are the capacity load, by charge amplification of a bipolar transistors in the pixels, and the peak outputs of following pixels can be read out since a signal charge accumulated in the bases of the bipolar transistors is non-destructive.

Figure 19:
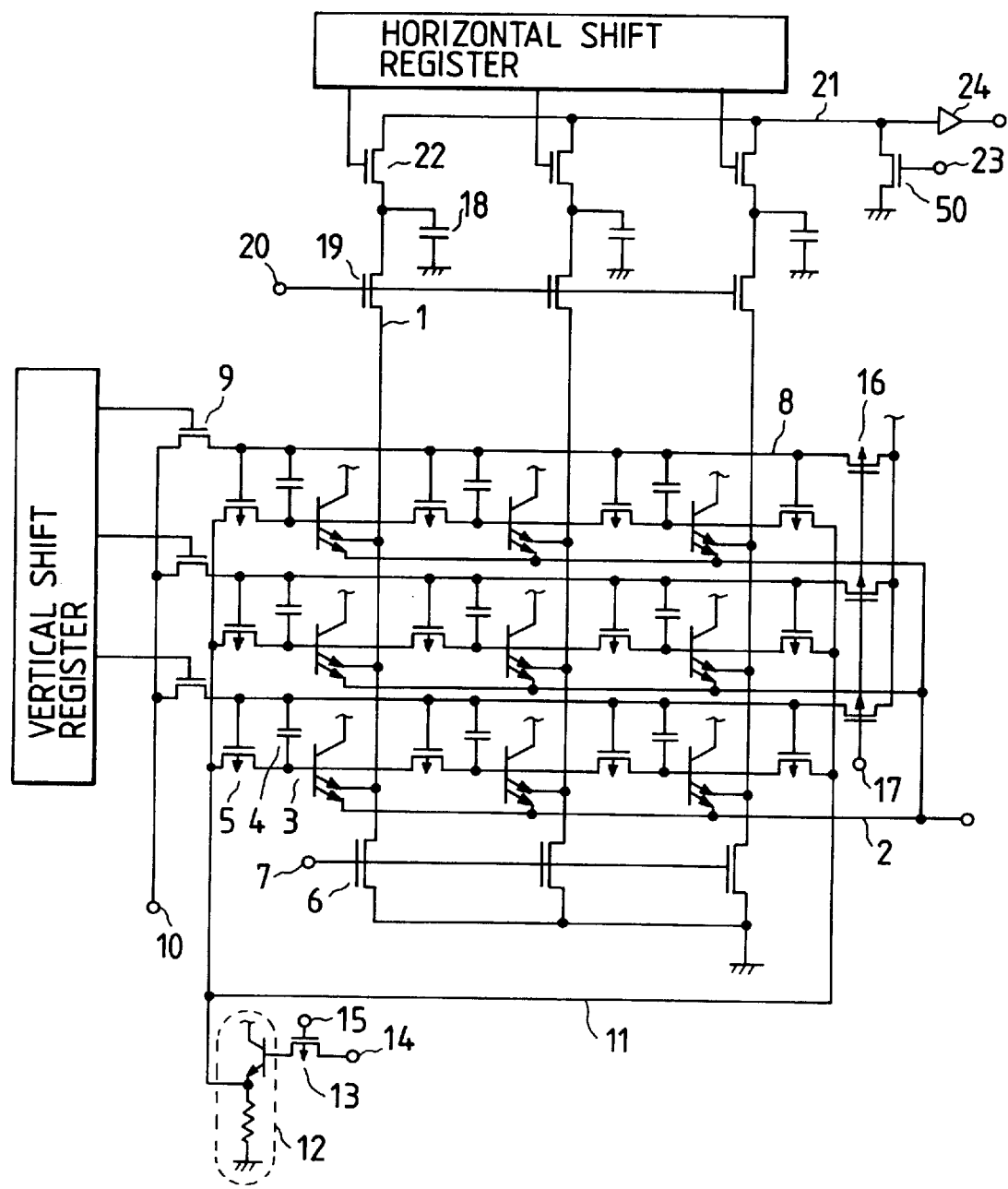
FIG. 19 is a schematic circuit diagram showing the second embodiment of the photoelectric conversion device according to the present invention.

FIG. 19 is a schematic circuit diagram showing the tenth embodiment of the photoelectric conversion device according to the invention. The same components as those of the ninth embodiment shown in FIG. 19 are given the same reference numerals and symbols and the description thereof is omitted (as in the embodiments 11 to 16 described later).

As shown in FIG. 19, this embodiment is arranged so that the second emitters of bipolar transistors are commonly connected and the peak signals of all sensors are outputted from the output lines 2 which are commonly connected. Driving to obtain the peak signals is carried out when a pulse from the terminal 17 is applied and the horizontal drive line 8 is boosted to the power supply voltage Vcc through the PMOS transistor 16.

In this embodiment, optical signals under an appropriate dose of exposure can be obtained without saturation of the sensors by detecting the peak signals of all sensors during the period of accumulation and finishing the accumulation when the peak signal values exceed the predetermined value.

The following briefly describes the operation.

The first reset procedure and the second reset procedure are carried out as in the ninth embodiment and accumulation of optical carriers of the sensors is started from the timing when the reset operation is finished. In this case, if the PMOS transistor 16 is set to ON by applying a low level pulse to the terminal 17 (usually, high level) during the accumulation time, the horizontal drive line 8 has a high level and the readout operation is carried out. At this time, the output lines 2 are commonly connected for all sensors and therefore only the bipolar transistor of the sensor in which optical carriers have been most accumulated is set to ON and the signal thereof is outputted to the output lines 2.

For example, this peak detecting operation is repeated at a specified interval and, when the voltage exceeds a predetermined threshold value, accumulation is finished and the signal readout from all sensors is started. This signal readout operation can be carried out as in the ninth embodiment.

With the above operation, optical signals under an appropriate dose of exposure can be obtained without saturation of any sensor.

In the bipolar transistors according to this embodiment, signals can be read out non-destructively. In this case, strictly, a non-destructive ratio of optical signals is expressed by the equation given below since part of optical carriers which are accumulated in the base areas of bipolar transistors are re-coupled when they are read out.

$$\frac{C_B h_{FE}}{C_B h_{FE} + C_T + C_V}$$

where, $C_B$ : Base capacity of the bipolar transistor $C_T$ : Accumulation capacity value $C_V$ : Parasitic capacity value of the vertical output line $h_{FE}$ : Current gain of the bipolar transistor Accordingly, $h_{FE}$ and $C_B$ should be large and $C_T$ and $C_V$ should be small to repeat the peak detecting operation and control the destructive ratio of optical carriers of the sensors. In the case of an area sensor with thousands to hundred thousands pixels, it has been ascertained from the tests that a non-destructive ratio as large as acceptable in practical use could be obtained by increasing the current gain $h_{FE}$ to approximately 2000.

Figure 20:
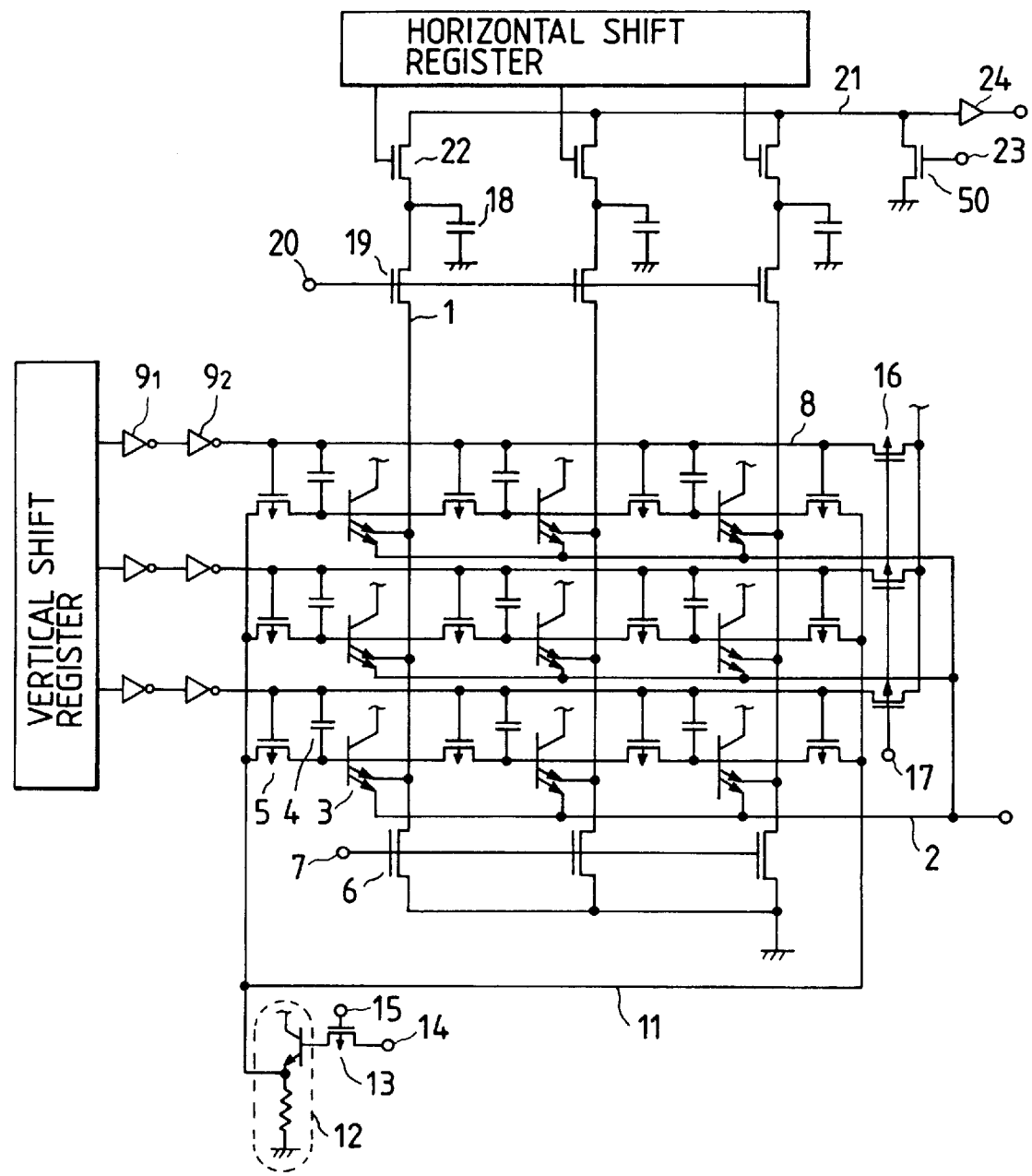
FIG. 20 is a schematic circuit diagram showing the third embodiment of the photoelectric conversion device according to the present invention.

FIG. 20 is a schematic circuit diagram showing the eleventh embodiment of the photoelectric conversion device of the invention. In the above ninth and tenth embodiments, since the reset operation (second reset) and the signal readout operation of the sensors are carried out through the buffer MOS transistor 9, the output from the vertical shift register should be set to be higher as much as at least a threshold voltage value of the MOS transistor than a high level of the drive pulse to directly transmit a drive pulse applied from the terminal 10 to the horizontal drive line 8 and therefore the withstand voltage of the vertical shift register should be high accordingly.

Figure 26:
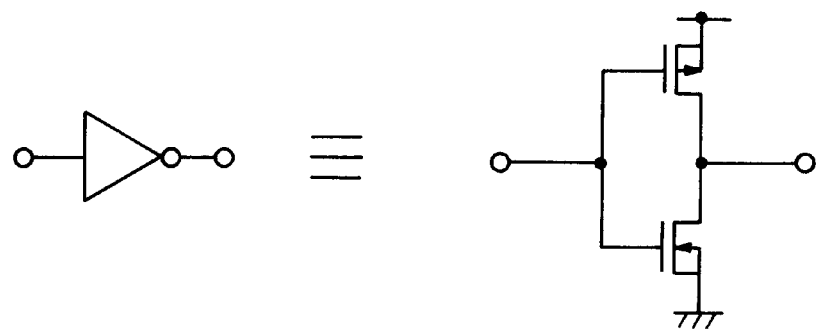
FIG. 26 is a schematic circuit diagram of a buffer.
Figure 27:
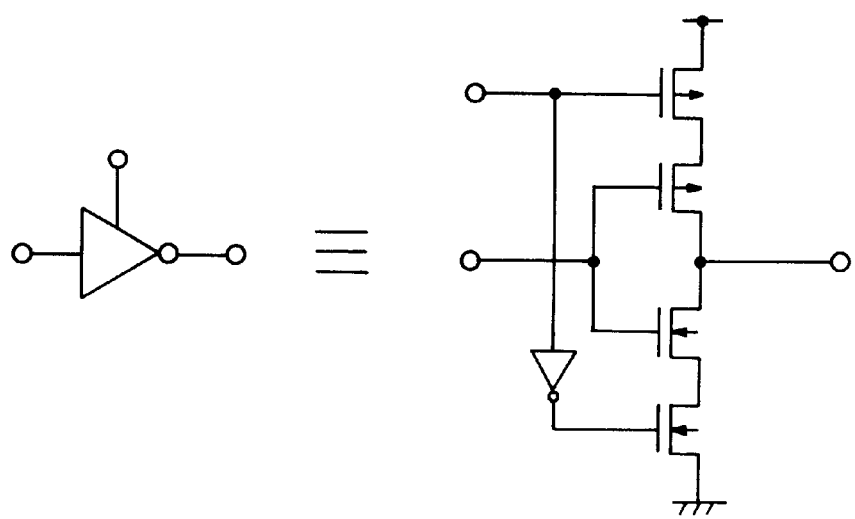
FIG. 27 is a schematic circuit diagram of a buffer.

In this embodiment, the horizontal drive line is driven by driving the output of the vertical shift register through, for example, the CMOS buffers $9_1$ and $9_2$. In this case, though the buffer $9_1$ can be an ordinary CMOS inverter circuit as shown in FIG. 26, a 3-value buffer which provides three kinds of outputs, that is, high level, low level and floating should be used as the buffer $9_2$ and, if the buffer $9_2$ is formed with, for example, CMOS transistors, a circuit configuration as shown in FIG. 27.

The operation of this embodiment is completely the same as the second embodiment. When the peak signal is detected, a low level (usually, a high level) is applied to the terminal 17 to make the output of the buffer 92 to a floating state and simultaneously the PMOS transistor to ON, and the operation is carried out by setting the horizontal drive line 8 to a high level.

This embodiment eliminates the above problem and, for example, a circuit can have a configuration having the withstand voltage of the horizontal shift register or the like.

In the ninth to eleventh embodiments, two emitters of bipolar transistor are provided for each sensor and therefore it is presumed that the area of the emitter contact and the wiring on each sensor cell becomes larger than the conventional sensor which comprises one emitter and the aperture ratio lowers and accordingly it is concerned that the aperture ratio becomes lower as the size of pixel is smaller. In this embodiment, one emitter terminal of the bipolar transistor is used for each conventional sensor and the peak signals are detected.

Figure 21:
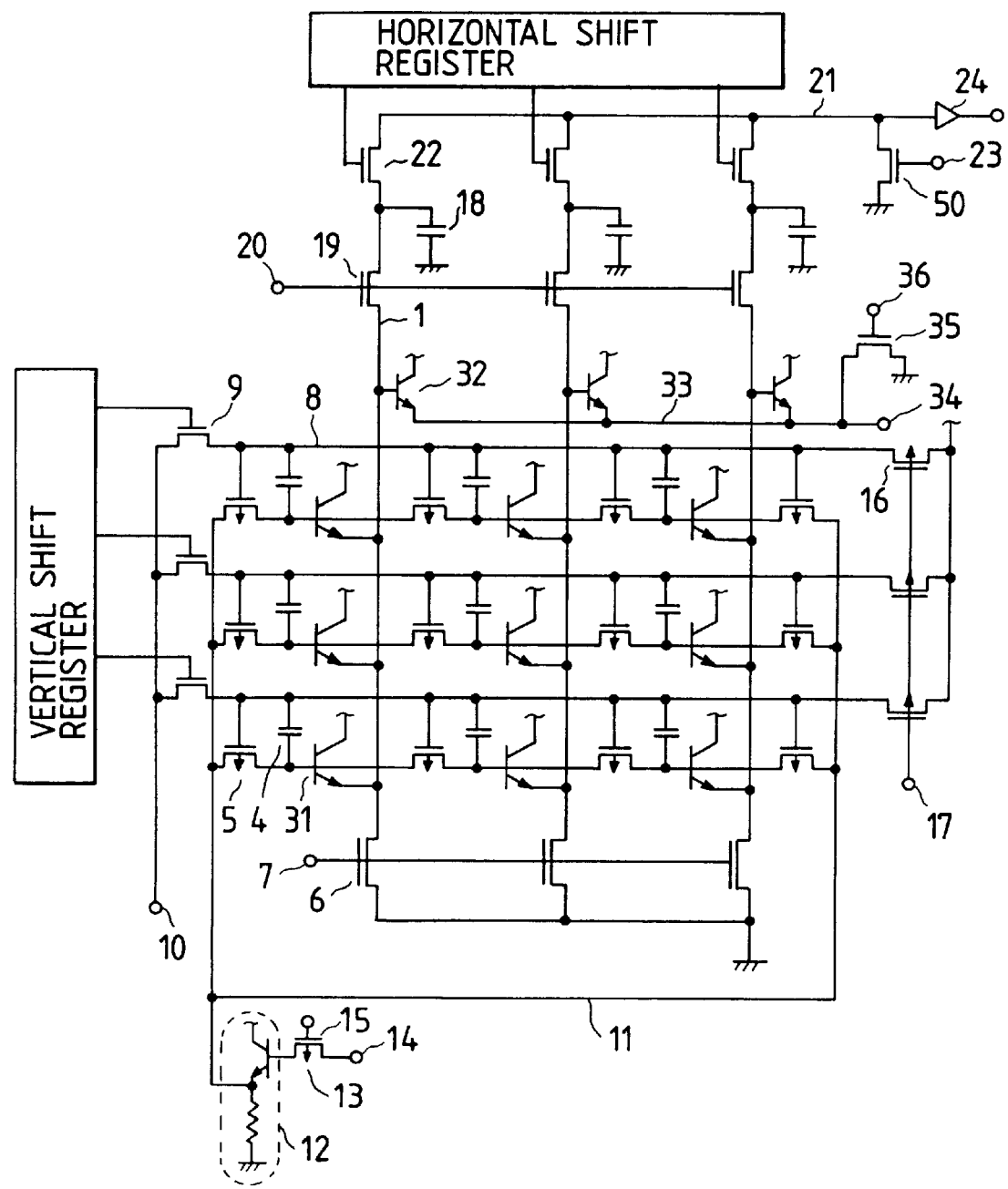
FIG. 21 is a schematic circuit diagram showing the fourth embodiment of the photoelectric conversion device according to the present invention.

FIG. 21 is a schematic circuit diagram showing the twelfth embodiment of the photoelectric conversion device of the invention. In FIG. 21, 31 is a bipolar transistor with a single emitter which forms the pixel, 32 is a bipolar transistor the base of which is connected to the vertical output line 1, 33 is a peak output line to be connected to the emitter of the bipolar transistor 32, 34 is an output terminal of the peak output line, 35 is a MOS transistor for resetting the peak output line 33, and 36 is a terminal for applying pulses to the gate of the MOS transistor 35.

Such operations of this embodiment as the first reset, second reset, accumulation, detection of the peak signals of the row outputted from the amplifier 24, and readout of pixel outputs are the same as those of the first embodiment. In the following, the line peak detecting operation which is a characteristic of this embodiment is described.

Peak value detection is carried out for the lines to be selected in sequence by the vertical shift register I. A pulse is applied to the terminal 7 to set the vertical output line 1 to the GND floating state and the pulse is applied to from the terminal 10 to the horizontal drive line 8 through the selected MOS transistor and the output of pixels of the line appears on the vertical output line 1. In this case, the MOS transistor 35 is kept at OFF and the peak value of the pixel of the selected line appears on the terminal 34. Detection of peak values of the next selected line is similarly carried out after the pulse has been applied to the terminal 36 to reset the output line 33.

Compared with the first to third embodiments which respectively have two emitters for one pixel, the above-described configuration permits to increase the aperture area of the pixel, to reduce the scale of the peripheral circuit, to carry out independent readout of the pixel signals and to detect the peak pixel position.

If a low level pulse is applied to the terminal 17 and the signals from all bipolar transistors are read out without sequential scanning by the vertical shift register I, the peak signals of all sensors can be read during accumulation as in the embodiment shown in FIG. 19. Specifically, when a low level pulse is applied to the terminal 17 in detection of the peak signal, all bipolar transistor start readout operation, the peak signals per row are read out to the vertical output line 1, and the largest signal of each row of these signals is outputted to the terminal 34 through the bipolar transistor 32. Accordingly, the peak signals of the sensors can be detected without a fall of the sensitivity of the sensors.

Figure 22:
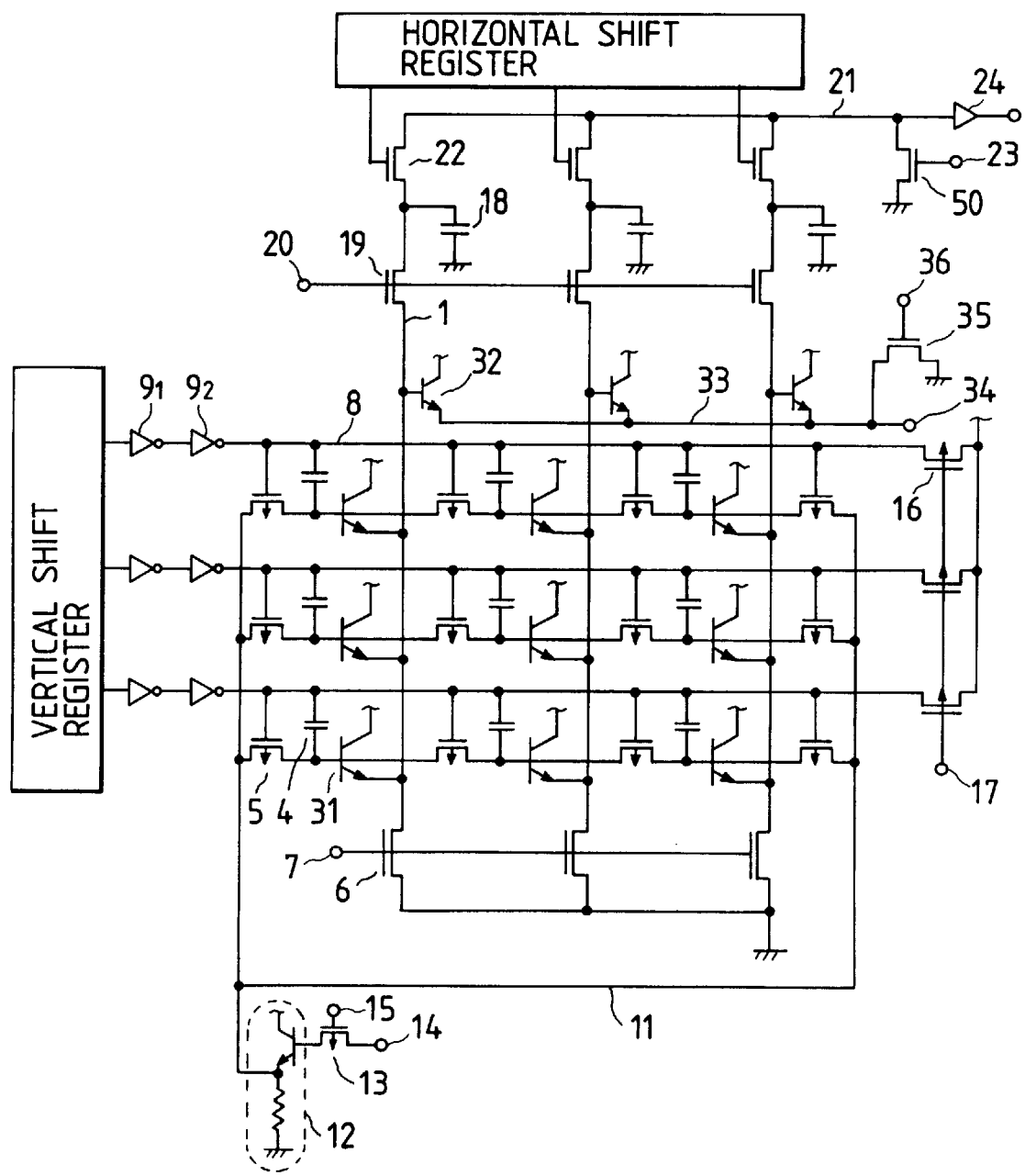
FIG. 22 is a schematic circuit diagram showing a modification of the fourth embodiment of the photoelectric conversion device according to the present invention.

In this embodiment, as shown in FIG. 22, CMOS buffers $9_1$ and $9_2$ can be provided instead of the MOS transistors as in the eleventh embodiment shown in FIG. 20.

Figure 23:
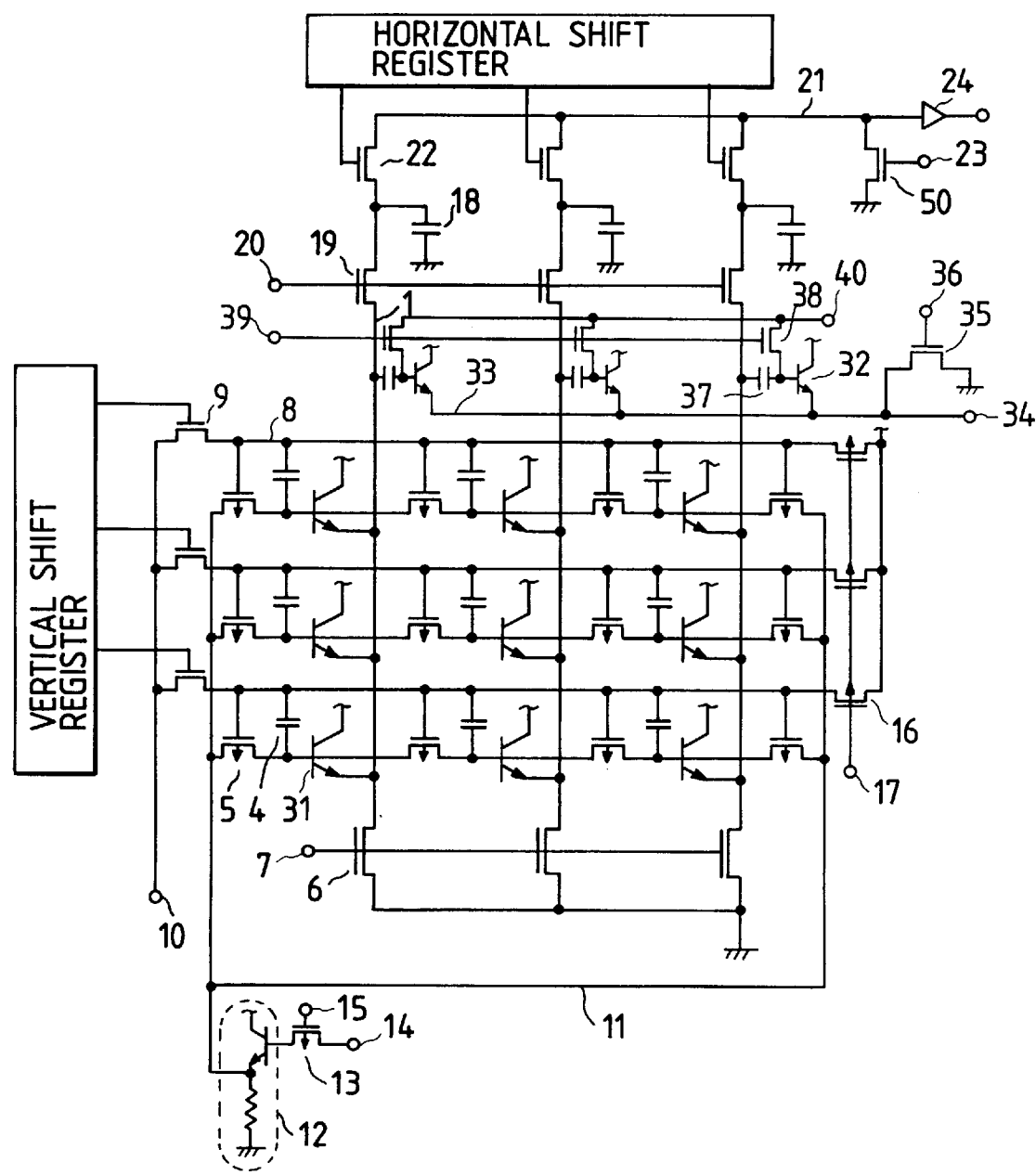
FIG. 23 is a schematic circuit diagram showing the fifth embodiment of the photoelectric conversion device according to the present invention.

FIG. 23 is a schematic diagram showing the thirteenth embodiment of the photoelectric conversion device of the invention. This embodiment is a modification of the twelfth embodiment and, in FIG. 23, 37 is a capacitor one electrode of which is connected to the vertical output line 1 and the other of which is connected to the base of the bipolar transistor 32, 38 is a MOS transistor for fixing the base potential of the bipolar transistor 32, 39 is a terminal for applying pulses to the gate of the MOS transistor, and 40 is a drain power supply terminal of the MOS transistor 38. In FIG. 23, the description of those parts common to FIG. 22 is omitted.

The following describes the peak detecting operation of the embodiment. However, the description of operations other than the peak detection of the line is omitted since these operations are the same as in the first embodiment.

Detection of peak value signals of lines is carried out by selecting the lines in sequence. The base of the bipolar transistor 32 is reset, in other words, set to a floating state with a certain specified potential through the MOS transistor 38 by applying a pulse to the terminal 39 immediately before applying a pixel readout pulse to the horizontal drive line 8. The output potential of the pixel which has been caused to appear on the vertical output line 1 by the readout pulse pushes up the base potential of the bipolar transistor 32 through the capacitor 37 and the peak output of the selected line appears on the terminal 34. Subsequent operations are the same as in the fourth embodiment, and the peak values can be more accurately detected because the DC potential of the terminal 34 can be sufficiently set and the bipolar transistor 32 can be certainly set to ON.

In the thirteenth embodiment, detection of the maximum peak value of the line is carried out and the minimum peak value can also be detected with the circuit configuration shown in FIG. 23. This embodiment is intended to detect the minimum peak value of the line by the photoelectric conversion device with the circuit configuration shown in FIG. 23.

The base potential of the bipolar transistor 32 is set to a floating state with a certain preset potential by applying a pulse to the terminal 39 when the output potential of the pixel of the selected line remains on the vertical output line 1 after the peak detection of the line shown in the thirteenth embodiment, and the vertical output line 1 is grounded by setting φVC of the terminal 7 to a high level. At this time, the base potential of the bipolar transistor 32 lowers through the capacitor 37 and this fall of the potential is proportional to the output potential of the peak and therefore the smaller the peak output is, the higher the base potential of the bipolar transistor 32 is. An inverted output of the selected line can be detected from the terminal 34 and therefore the minimum peak value of the line can be detected.

Figure 24:
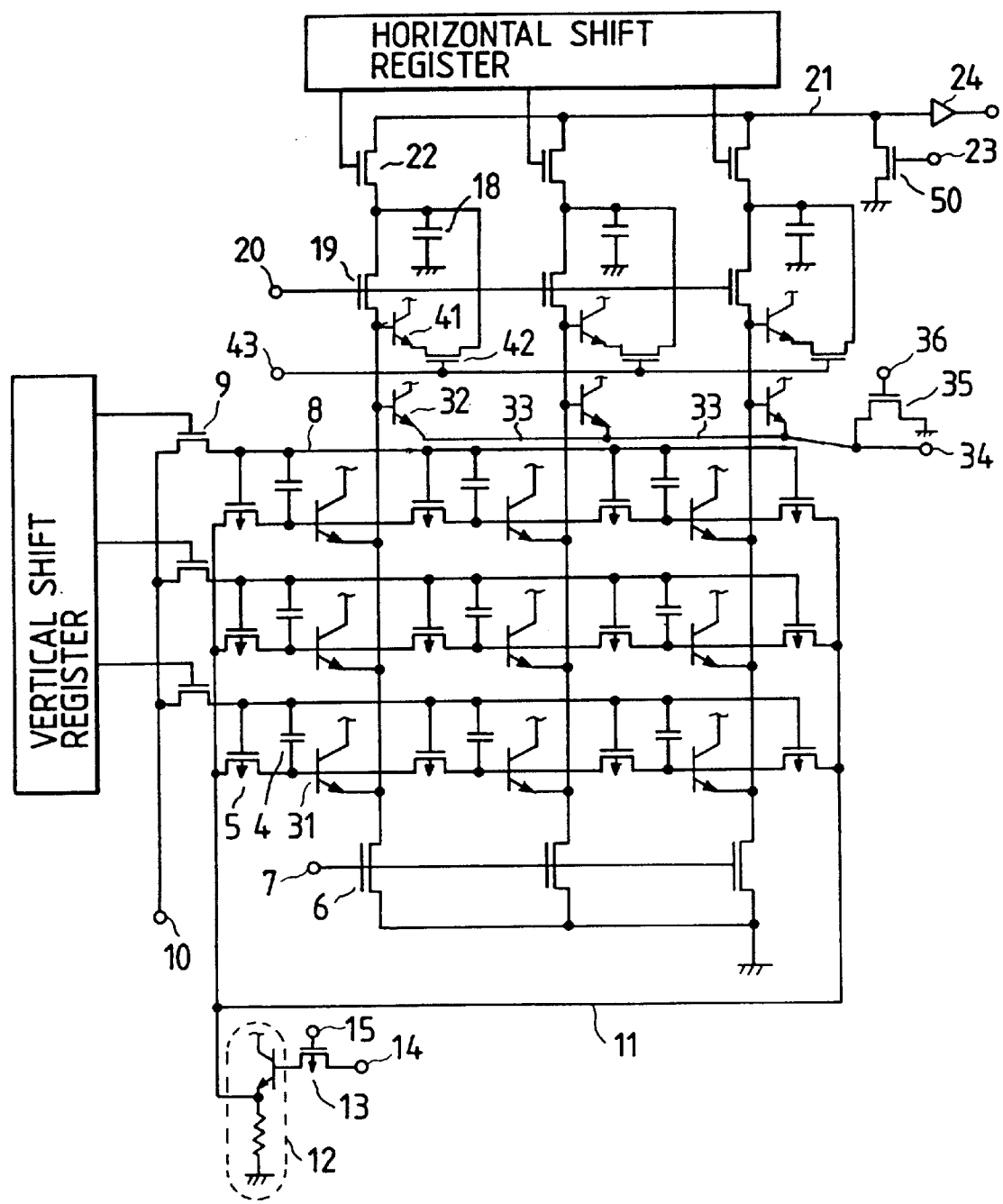
FIG. 24 is a schematic circuit diagram showing the sixth embodiment of the photoelectric conversion device according to the present invention.

FIG. 24 is a schematic circuit diagram showing the fifteenth embodiment of the photoelectric conversion device of the invention. In FIG. 24, 41 is a bipolar transistor the base of which is connected to the vertical output line 1, 42 is a MOS transistor for connecting the emitter of the bipolar transistor 41 and the accumulation capacitor 18, and 43 is a terminal for applying pulses to the gate of the MOS transistor 42. In FIG. 24, the description of those components common to FIG. 21 is omitted. This embodiment differs from the photoelectric conversion device according to the twelfth embodiment in the operation for peak value detection of the rows and therefore only the peak detection of rows is described below.

The capacitors 18 are reset by applying a pulse to the terminal 20 immediately before the peak detection of lines is started. The terminal 43 is set to a high level and the MOS transistor 42 is kept ON while the peak detection of lines is carried out in sequence. Since the emitter potential of the bipolar transistor 41 is outputted as a potential which is determined by the highest potential of the vertical output line 1 during the peak detection of lines and, when the peak detection of all lines is finished, the peak potential of pixels of respective rows is accumulated in the capacitors 18. When the MOS transistor 42 is set to OFF by setting the terminal 43 to a low level and the horizontal shift register is started, the peak output values of respective rows are transferred to the horizontal output line 21 and the peak values of rows are outputted in sequence from the amplifier 24.

In this embodiment, the MOS transistor 16 and the terminal 17 for setting the potential of the horizontal drive line 8 to a high level are unnecessary and therefore the peripheral circuit of the sensor can be simplified.

Figure 25:
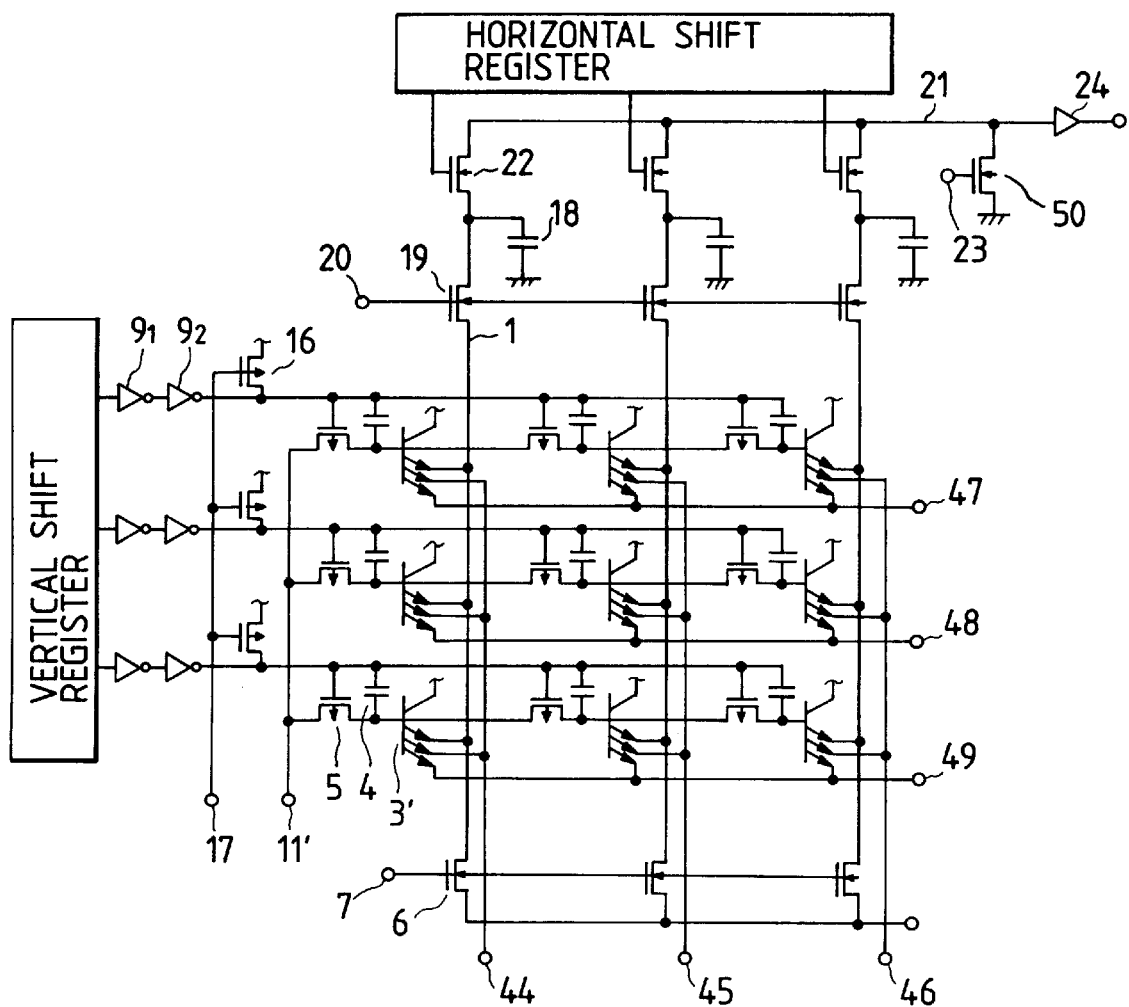
FIG. 25 is a schematic circuit diagram showing the embodiment of the photoelectric conversion device according to the present invention.

FIG. 25 is a schematic circuit diagram showing the sixteenth embodiment of the photoelectric conversion according to the invention. In this embodiment, the bipolar transistors are respectively provided with three emitters. In FIG. 25, the emitter-follower circuit part 12 to be connected to the PMOS transistor, MOS transistor 13 and part of the wiring 11 are omitted and only the terminal 11' is shown. The circuit configuration of this embodiment is the same as that shown in FIG. 20 except that the bipolar transistor 3' and terminals 44 to 49 are provided.

The above emitters are connected as described below. The first emitter is connected to the accumulation capacitors 18 through the MOS transistors 19 for readout as in the eleventh embodiment shown in FIG. 20. The second emitter is connected in common to the rows of each sensor and outputted to terminals 44, 45 and 46, respectively. The third emitter is connected in common to the lines of each sensor and outputted to terminals 47, 48 and 49, respectively.

Operation of this embodiment is completely the same as that of the eleventh embodiment and, in peak signal detection, the peak signal of the first row is outputted to the terminal 44, the peak signal of the second row to the terminal 45, the peak signal of the third signal to the terminal 46, the peak signal of the first line to the terminal 47, the peak signal of the second line to the terminal 48, and the peak signal of the third line to the terminal 49, respectively. The peak signals can be obtained and the addresses of the sensors which output the peak signals can be detected by comparing the output values of terminals 44, 45 and 46 and terminals 47, 48 and 49.

Though the sensitivity deteriorates due to provision of three emitters, characteristic points can be simply extracted for specifying an area with a bright image and therefore the above-described advantage can be provided to make this embodiment useful when the device thereof is used in a sensor for a relatively large image size.

As described above, the ninth to sixteenth embodiments of the invention enable to quickly detect a position of peak pixels in a non-destructive mode without deterioration of the performance of sensor pixels (transistors in the 2-dimensional array) and provision of a large-scale peripheral circuits.

Peak signal can be detected from the transistor in the 2-dimensional array, accumulation time can be controlled by finishing the accumulation according to the detected peak signals and optical signals under an appropriate dose of exposure can be obtained from the whole image without saturation of the array of transistors.

What is claimed is:

1. An area sensor comprising:
a plurality of photoelectric conversion picture elements adapted to receive an optical image, each picture element providing a photoelectrically converted output signal, wherein said plurality of photoelectric conversion picture elements are divided into a plurality of groups of adjacent picture elements, and wherein said plurality of groups are arranged two-dimensionally in horizontal and vertical directions;
a peak detection unit adapted to detect in parallel peak signals of the respective groups arranged in the horizontal direction, and to detect sequentially the peak signals of the respective groups arranged in the vertical direction, wherein said peak detection unit includes a plurality of peak detection portions, and wherein the peak signals of the respective groups arranged in the horizontal direction are detected by different peak detection portions and the peak signals of the respective groups arranged in the vertical direction are detected by a single peak detection portion; and
an outputting unit coupled to said peak detection unit to output the peak signals of each of said plurality of groups arranged in the two-dimensional form.

2. An area sensor according to claim 1, wherein each of said plurality of photoelectric conversion picture elements comprises an associated outputting unit adapted to output a signal.

3. An area sensor according to claim 1, wherein each of said plurality of photoelectric conversion picture elements is a transistor for accumulating carriers generated by photoelectric conversion in a respective base.

4. An area sensor according to claim 1, wherein said area sensor is a single semiconductor integrated circuit.

5. An image processing device, comprising:
an area sensor comprising a plurality of photoelectric conversion picture elements adapted to receive an optical image, wherein said plurality of photoelectric conversion picture elements are divided into a plurality of groups of adjacent picture elements, and wherein said plurality of groups are arranged two-dimensionally in horizontal and vertical directions;
a peak detection unit adapted to detect in parallel peak signals of the respective groups arranged in the horizontal direction, and to detect sequentially peak signals of the respective groups arranged in the vertical direction, wherein said peak detection unit includes a plurality of peak detection portions, and wherein the peak signals of the respective groups arranged in the horizontal direction are detected by different peak detection portions and the peak signals of the respective groups arranged in the vertical direction are detected by a single peak detection portion;
an output unit coupled to said peak detection unit to output a peak signal of each of said plurality of groups arranged two-dimensionally; and
a discriminating unit to discriminate whether or not image information is obtained, on the basis of the output peak signal.

6. An image processing device according to claim 5, wherein said area sensor is a single semiconductor integrated circuit.

7. An area sensor comprising:
a plurality of photoelectric conversion picture elements adapted to receive an optical image, wherein said plurality of photoelectric conversion picture elements are divided into a plurality of groups of adjacent picture elements, and wherein said plurality of groups are arranged two-dimensionally in horizontal and vertical directions;
a peak detection unit adapted to detect in parallel peak signals of the respective groups arranged in the horizontal direction, and to detect sequentially peak signals of the respective groups arranged in the vertical direction, wherein said peak detection unit includes a plurality of peak detection portions, and wherein the peak signals of the respective groups arranged in the horizontal direction are detected by different peak detection portions and the peak signals of the respective groups arranged in the vertical direction are detected by a single peak detection portion;
an output unit coupled to said peak detection unit to output a peak signal of each of said plurality of groups arranged two-dimensionally; and a reading unit to read each signal from a plurality of said photoelectric conversion picture elements, wherein said peak signal and each said signal are outputted from different output channels respectively.

8. A sensor according to claim 7, wherein said each signal and said peak signal are output from a same output portion of the respective picture element and are then output to the channels through a same output line.

9. An area sensor according to claim 7, wherein said area sensor is a single semiconductor integrated circuit.

10. An area sensor comprising:

a plurality of photoelectric conversion picture elements for converting a received optical image into an electrical signal, each picture element reading out said electrical signal non-destructively, wherein said plurality of photoelectric conversion picture elements are divided into a plurality of groups of adjacent picture elements, and wherein said plurality of groups are arranged two-dimensionally in horizontal and vertical directions;

a peak detection unit adapted to detect in parallel peak signals of the respective groups arranged in the horizontal direction, and to detect sequentially peak signals of the respective groups arranged in the vertical direction, wherein said peak detection unit includes a plurality of peak detection portions, and wherein the peak signals of the respective groups arranged in the horizontal direction are detected by different peak detection portions and the peak signals of the respective groups arranged in the vertical direction are detected by a single peak detection portion;

an output unit coupled to said peak detection unit to output a peak signal of each of said plurality of groups arranged two-dimensionally; and a reading unit to read a signal from a plurality of the photoelectric conversion picture elements.

11. An area sensor according to claim 10, wherein said area sensor is a single semiconductor integrated circuit.

12. An image processing device, comprising:

a sensor portion comprising a plurality of photoelectric conversion picture elements for receiving an optical image, wherein said plurality of photoelectric conversion picture elements are divided into a plurality of groups of adjacent picture elements and wherein said plurality of groups are arranged two-dimensionally in horizontal and vertical directions; and a peak detection unit to detect in parallel peak signals of the respective groups arranged in the horizontal direction, and to detect sequentially peak signals of the respective groups arranged in the vertical direction, wherein said peak detection unit includes a plurality of peak detection portions, and wherein the peak signals of the respective groups arranged in the horizontal direction are detected by different peak detection portions and the peak signals of the respective groups arranged in the vertical direction are detected by a single peak detection portion.

13. A device according to claim 12, further comprising:

an output unit adapted to output the signals from each of the plurality of picture elements; and an image processor adapted to perform image processing on the output signal on the basis of the peak signal of the respective group.

14. A device according to claim 12, wherein said sensor portion is a single semiconductor integrated circuit.

* * * * *

UNITED STATES PATENT AND TRADEMARK OFFICE
CERTIFICATE OF CORRECTION

PATENT NO. : 6,980,243 B2  
APPLICATION NO. : 08/687945  
DATED : December 27, 2005  
INVENTOR(S) : Miyawaki et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 409 days Delete the phrase "by 409 days" and insert -- by 361 days --

Signed and Sealed this

Eleventh Day of March, 2008

JON W. DUDAS  
*Director of the United States Patent and Trademark Office*